US012345573B2

(12) United States Patent
Klimov et al.

(10) Patent No.: US 12,345,573 B2
(45) Date of Patent: Jul. 1, 2025

(54) PHOTONIC BOLOMETER AND PERFORMING BROADBAND HIGH-ABSORPTION PHOTONIC BOLOMETRY

(71) Applicant: Government of the United States of America, as represented by the Secretary of Commerce, Gaithersburg, MD (US)

(72) Inventors: Nikolai Nikolaevich Klimov, Ellicott City, MD (US); Nathan Andrew Tomlin, Boulder, CO (US); Christopher Shing-Yu Yung, Louisville, CO (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 193 days.

(21) Appl. No.: 17/957,817

(22) Filed: Sep. 30, 2022

(65) Prior Publication Data
US 2023/0032022 A1 Feb. 2, 2023

Related U.S. Application Data

(63) Continuation-in-part of application No. 17/486,852, filed on Sep. 27, 2021, now Pat. No. 12,066,741.
(Continued)

(51) Int. Cl.
*G01J 5/0818* (2022.01)
*G01J 5/08* (2022.01)
(Continued)

(52) U.S. Cl.
CPC .............. *G01J 5/58* (2013.01); *G01J 5/0818* (2013.01); *G01J 5/0853* (2013.01); *G01J 5/20* (2013.01)

(58) Field of Classification Search
CPC .......... G01J 5/58; G01J 5/0818; G01J 5/0853; G01J 5/20
See application file for complete search history.

(56) References Cited

U.S. PATENT DOCUMENTS

| 3,898,605 A | 8/1975 | Burns |
| 5,393,351 A | 2/1995 | Kinard et al. |

(Continued)

FOREIGN PATENT DOCUMENTS

WO 2017048189 A1 3/2017

OTHER PUBLICATIONS

Yang, W., et al., "Silicon-on-insulator microring resonator sensor based on an amplitude comparison sensing function", Optics Letters, 2018, p. 70-73, vol. 43 No. 1.
(Continued)

*Primary Examiner* — Jean B Jeanglaude
(74) *Attorney, Agent, or Firm* — Office of Chief Counsel for National Institute of Standards and Technology

(57) ABSTRACT

A photonic bolometer includes: a photonic chip; a weak thermal link; a thermally-isolated member, and the weak thermal link thermally isolates the thermally-isolated member from the photonic chip; a photonic temperature sensor; a chip waveguide in optical communication with the photonic temperature sensor; and a photon absorber that receives incident radiation light, increases temperature due to absorption of the incident radiation light, heats the photonic temperature sensor in response to receipt of the inci-
(Continued)

dent radiation light, and changes the resonance frequency of the photonic temperature sensor in response to receiving the incident radiation light.

20 Claims, 21 Drawing Sheets

Related U.S. Application Data

(60) Provisional application No. 63/251,186, filed on Oct. 1, 2021, provisional application No. 63/083,218, filed on Sep. 25, 2020.

(51) Int. Cl.
*G01J 5/20* (2006.01)
*G01J 5/58* (2022.01)

(56) References Cited

U.S. PATENT DOCUMENTS

| | | | |
|---|---|---|---|
| 5,499,313 | A | 3/1996 | Kleinerman |
| 6,921,195 | B2 | 7/2005 | Pipe et al. |
| 7,249,881 | B2 | 7/2007 | Pipe et al. |
| 7,636,522 | B2 | 12/2009 | Nagarajan et al. |
| 8,798,414 | B2 | 8/2014 | Quan et al. |
| 9,726,553 | B2 | 8/2017 | Ahmed et al. |
| 10,955,617 | B2 | 3/2021 | Klimov et al. |
| 2006/0067605 | A1* | 3/2006 | Mirkarimi ............ G02B 6/1225 385/12 |
| 2014/0321502 | A1* | 10/2014 | Ahmed ................ G01K 11/00 374/130 |

OTHER PUBLICATIONS

Qian, W., et al., "High-sensitivity temperature sensor based on an alcohol-filled photonic crystal fiber loop mirror", Optics Letters, 2011, p. 1548-1550, vol. 36 No. 9.

Zhang, H.-J., et al., "A Perfect Graphene Absorber with Waveguide Coupled High-Contract Gratings", Chinese Physics Letter, 2018, p. 038102, vol. 35 No. 3.

Shang, Y., et al., "Coaxial Dual-wavelength Interferometric Method for a Thermal Infrared Focal-plane-array with Integrated Gratings", Nature: Scientific Reports, 2016, p. 1-10, DOI: 10.1038/srep25993.

Ostrower, D., et al., "Optical Thermal Imaging—replacing microbolometer technology and achieving universal deployment", The Advanced Semiconductor Magazine, 2006, p. 24-27, vol. 19 No. 6.

Purdy, T.P., et al., "Quantum correlations from a room-temperature optomechanical cavity" Science, 2017, p. 1265-1268, vol. 356.

Katzmann, F.L., et al., "AC-DC Thermal Converter with Infrared-Transmissive Fiber Coupling", IEEE Transactions on Instrumentation and Measurement, 1999, p. 415-417, vol. 48 No. 2.

Castelli, F., "The Infrared Thermal Converter as a Highly Precise Transfer Standard", IEEE Instrumentation and Measurement Technology Conference and IMEKO, 1996, p. 206-213.

Katzmann, F.L., et al., "A New Optically Sensed Thermal Element for Precise AC-DC Conversion", IEEE Transactions on Instruments and Measurements, 1993, p. 191-194, vol. 42 No. 2.

Lipe, T.E., et al., "New High-Frequency MJTCs of Novel Design on Fused Silica Substrates", 2012 Conference on Precision Electromagnetic Measurments, IEEE, 2012, p. 434-435.

* cited by examiner

Dither laser locking: Transmission-mode measurements

Dither laser locking: Reflection-mode measurements

Pound-Drever-Hall laser locking: Transmission-mode measurements

Pound-Drever-Hall laser locking: Reflection-mode measurements

PHOTONIC BOLOMETER AND PERFORMING BROADBAND HIGH-ABSORPTION PHOTONIC BOLOMETRY

CROSS REFERENCE TO RELATED APPLICATIONS

This application is a continuation in part of U.S. patent application Ser. No. 17/486,852 (filed Sep. 27, 2021), which claims the benefit of U.S. Provisional Patent Application Ser. No. 63/083,218 (filed Sep. 25, 2020), which are herein incorporated by reference in their entirety. This application claims the benefit of U.S. Provisional Patent Application Ser. No. 63/251,186 (filed Oct. 1, 2021), which is herein incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in this invention.

BRIEF DESCRIPTION

Disclosed is a photonic bolometer for performing broadband high-absorption photonic bolometry, the photonic bolometer comprising: a photonic chip; a weak thermal link disposed on and in mechanical communication with the photonic chip; a thermally-isolated member disposed on the weak thermal link and in mechanical communication with the weak thermal link, such that the weak thermal link is interposed between the thermally-isolated member and the photonic chip, and the weak thermal link thermally isolates the thermally-isolated member from the photonic chip; a photonic temperature sensor disposed on the thermally-isolated member and comprising a resonance frequency from which a temperature of the thermally-isolated member is determinable and that varies with temperature of the thermally-isolated member, wherein the photonic temperature sensor receives primary probe light from a chip waveguide and produces a bolometer light from the primary probe light; the chip waveguide disposed on the thermally-isolated member in optical communication with the photonic temperature sensor and that communicates the primary probe light to the photonic temperature sensor and that monitors transmission and storage of the primary probe light by the photonic temperature sensor, wherein the chip waveguide receives the bolometer light from the photonic temperature sensor to determine the temperature of the thermally-isolated member via a change in resonance frequency of the photonic temperature sensor; and a photon absorber disposed on the thermally-isolated member in thermal communication with the photonic temperature sensor and that receives incident radiation light, increases temperature due to absorption of the incident radiation light, heats the photonic temperature sensor in response to receipt of the incident radiation light, and changes the resonance frequency of the photonic temperature sensor in response to receiving the incident radiation light.

Disclosed is a photonic bolometry system, comprising: a chip probe light source that receives a control light signal and produces a primary probe light based on the control light signal; a photonic bolometer in optical communication with the chip probe light source and that receives the primary probe light from the chip probe light source, receives incident radiation light, and produces ref a244 from the ref a206 in response to receiving the incident radiation light, the photonic bolometer comprising: a photonic chip; a weak thermal link disposed on and in mechanical communication with the photonic chip; a thermally-isolated member disposed on the weak thermal link and in mechanical communication with the weak thermal link, such that the weak thermal link is interposed between the thermally-isolated member and the photonic chip, and the weak thermal link thermally isolates the thermally-isolated member from the photonic chip; a photonic temperature sensor disposed on the thermally-isolated member and comprising a resonance frequency from which a temperature of the thermally-isolated member is determinable and that varies with temperature of the thermally-isolated member, wherein the photonic temperature sensor receives primary probe light from a chip waveguide and produces a bolometer light from the primary probe light; the chip waveguide disposed on the thermally-isolated member in optical communication with the photonic temperature sensor and that communicates the primary probe light to the photonic temperature sensor and that monitors transmission and storage of the primary probe light by the photonic temperature sensor, such that the chip waveguide receives the primary probe light from the chip probe light source, receives the bolometer light from the photonic temperature sensor, and communicates the bolometer light to a photodetector; and a photon absorber disposed on the thermally-isolated member in thermal communication with the photonic temperature sensor and that receives incident radiation light, increases temperature due to absorption of the incident radiation light, heats the photonic temperature sensor in response to receipt of the incident radiation light, and changes the resonance frequency of the photonic temperature sensor in response to receiving the incident radiation light; a photodetector in optical communication with the photonic bolometer and that receives the bolometer light from the chip waveguide of the photonic bolometer and produces photodetector signal in response to receiving the bolometer light from the photonic bolometer; a phase sensitive detector in electrical communication with the photodetector and that receives the photodetector signal from the photodetector, receives a reference frequency signal, and produces a lock signal based on the photodetector signal with reference to the reference frequency signal; a local oscillator in electrical communication with the phase sensitive detector and a servo controller and that produces the reference frequency signal and communicates the reference frequency signal to the phase sensitive detector and the servo controller; the servo controller in electrical communication with the phase sensitive detector and the local oscillator and that receives the lock signal from the phase sensitive detector, receives the reference frequency signal from the local oscillator, produces control light signal in response to receiving the lock signal and the reference frequency signal, and communicates the control light signal to the chip probe light source, wherein the temperature of the thermally-isolated member is determined via a change in resonance frequency of the photonic temperature sensor.

Disclosed is a process for performing broadband high-absorption photonic bolometry with a photonic bolometer, the process comprising: receiving primary probe light by a chip waveguide of the photonic bolometer; communicating the primary probe light from the chip waveguide to a photonic temperature sensor of the photonic bolometer; receiving incident radiation light by a photon absorber of the photonic bolometer; increasing the temperature of the photon absorber in response to receiving the incident radiation light; communicating heat from the photon absorber to the photonic temperature sensor; receiving, by the photonic temperature sensor, the heat from the photon absorber and increasing a temperature of the photonic temperature sensor in response to receiving the heat from the photon absorber; changing a resonance frequency of the photonic temperature sensor in response to increasing the temperature of the photonic temperature sensor due to absorption of the incident radiation light by the photon absorber; producing, by the photonic temperature sensor, bolometer light from the primary probe light based on the change of the resonance frequency due to heating the photonic temperature sensor; communicating the bolometer light from the photonic temperature sensor to the chip waveguide; and determining the temperature change of the photonic temperature sensor due to the absorption of the incident radiation light by the photon absorber from the bolometer light to perform broadband high-absorption photonic bolometry.

BRIEF DESCRIPTION OF THE DRAWINGS

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
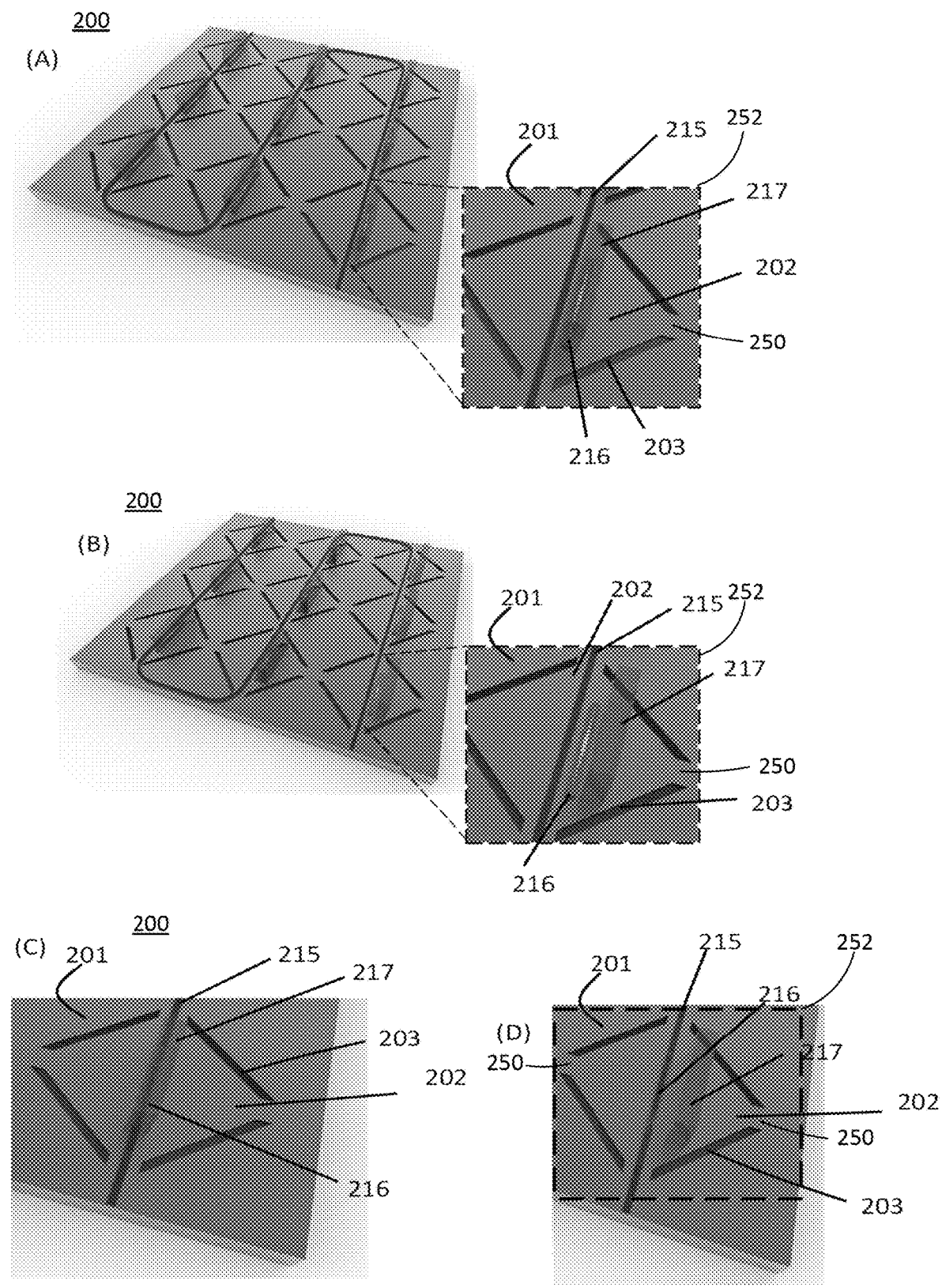
FIG. 1 shows perspective views of photonic bolometers that include an array of photonic bolmetric pixels in panels (A), (B), and (C) along with insets for a corresponding single photonic bolometric pixel, according to an embodiment.
Figure 2:
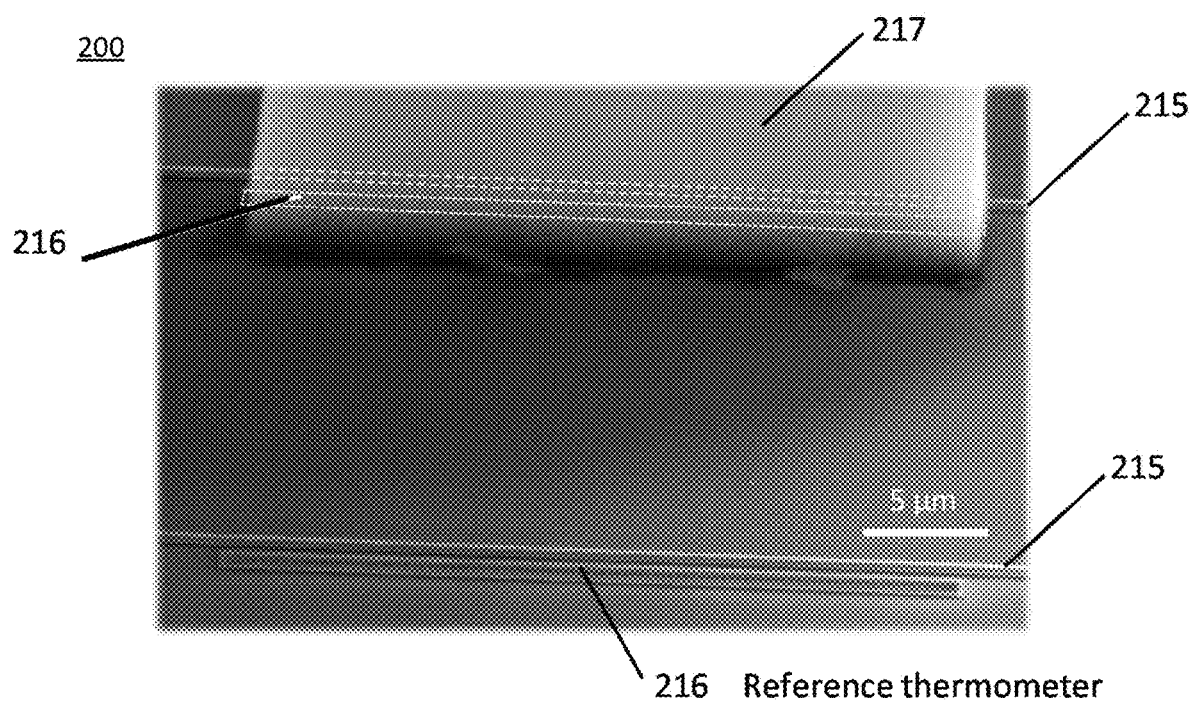
FIG. 2 shows an SEM of a photonic bolometer, according to an embodiment.
Figure 3:
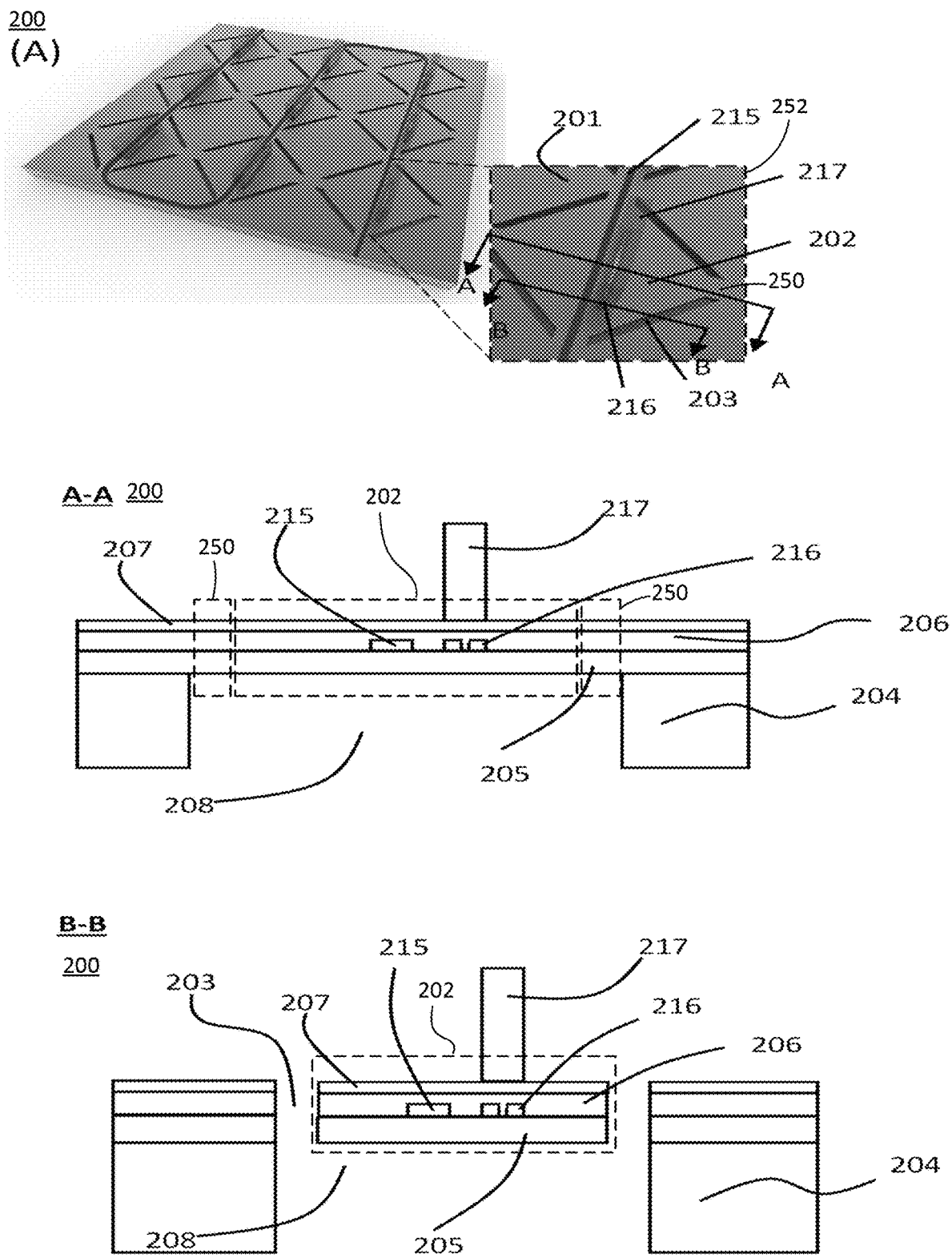
FIG. 3 shows a perspective view of a photonic bolometer and cross-sections of the photonic bolometer, according to an embodiment.
Figure 4:
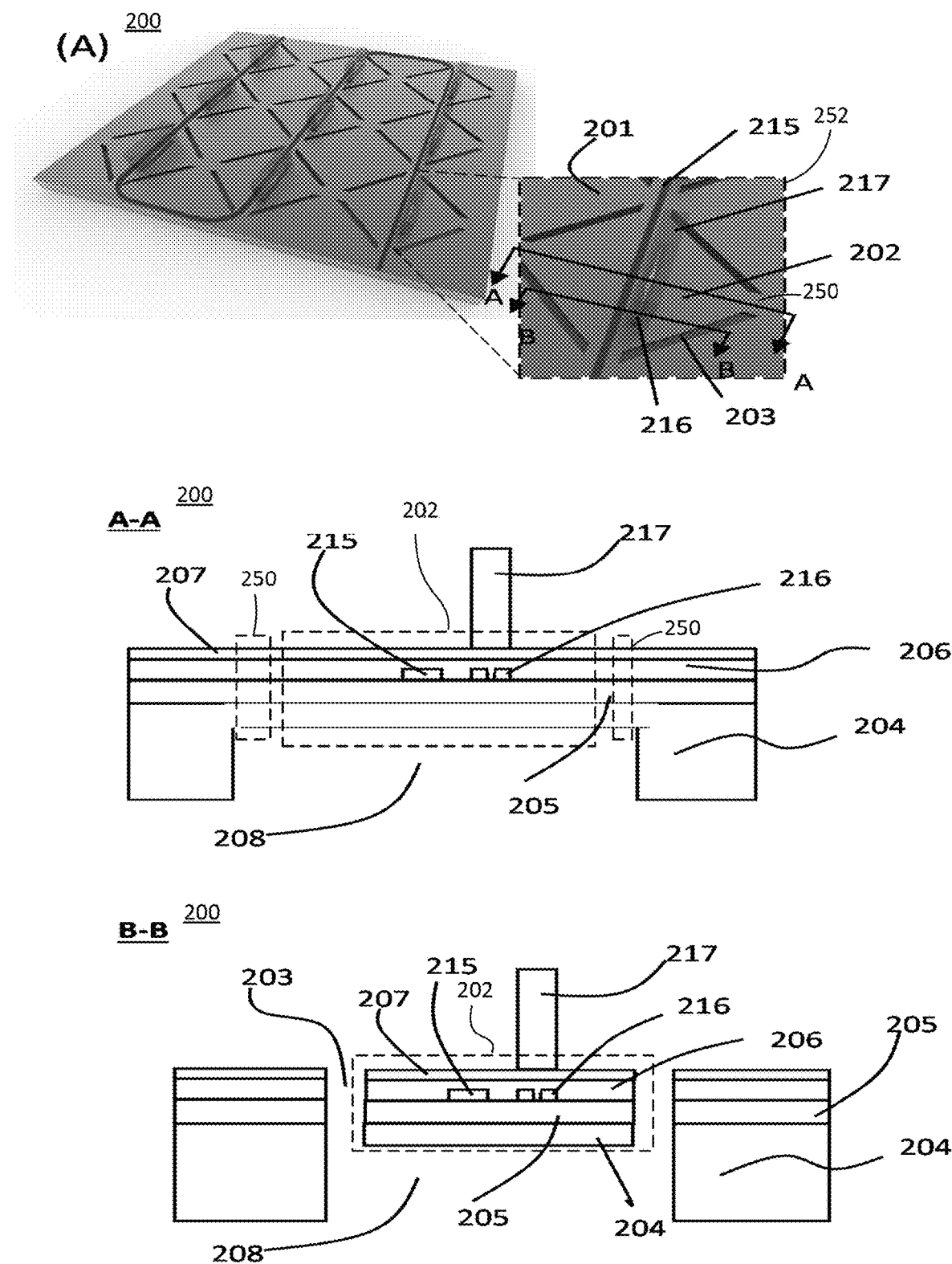
FIG. 4 shows a perspective view of a photonic bolometer and cross-sections of the photonic bolometer, according to an embodiment.
Figure 5:
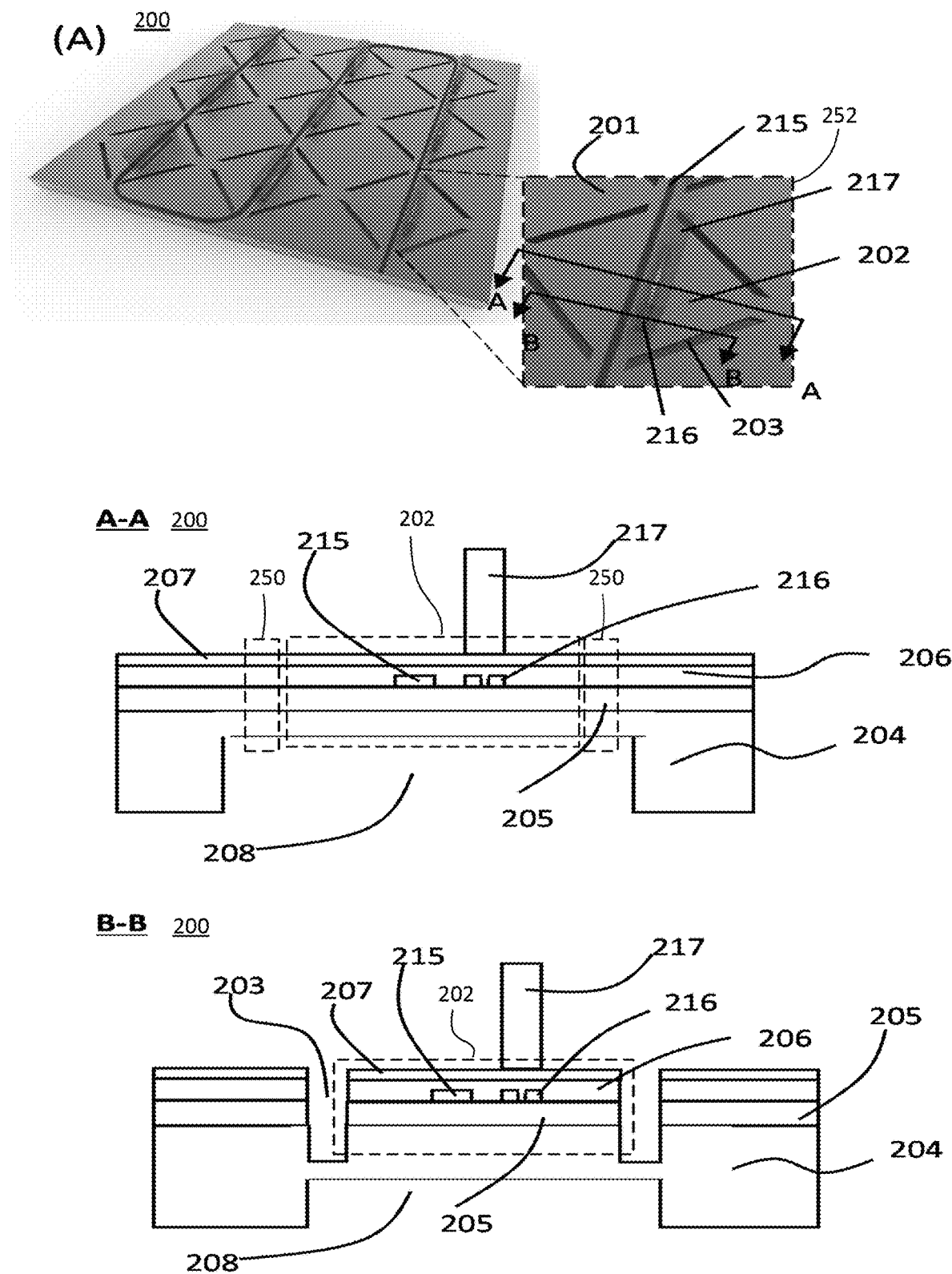
FIG. 5 shows a perspective view of a photonic bolometer and cross-sections of the photonic bolometer, according to an embodiment.
Figure 6:
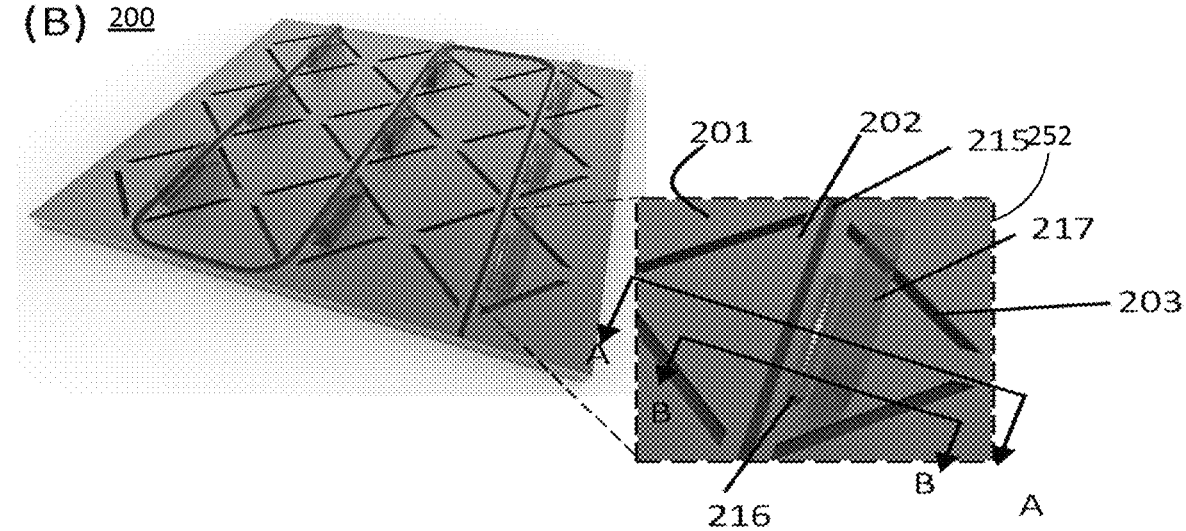
FIG. 6 shows a perspective view of a photonic bolometer and cross-sections of the photonic bolometer, according to an embodiment.
Figure 6:
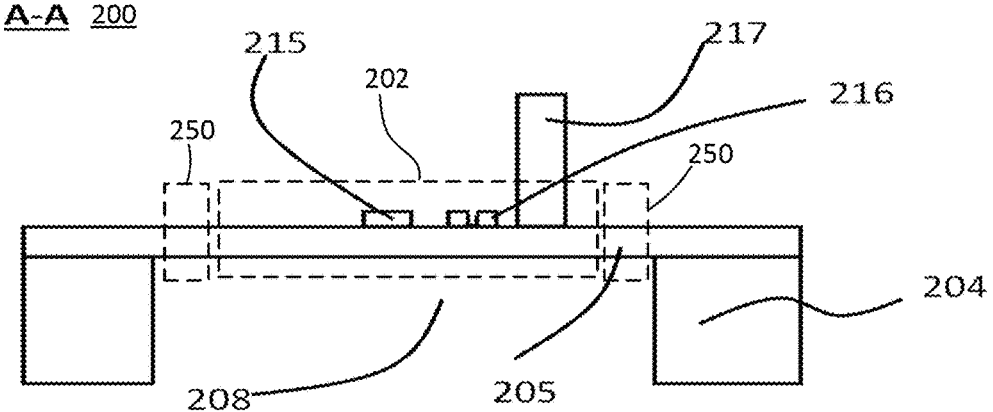
Figure 6:
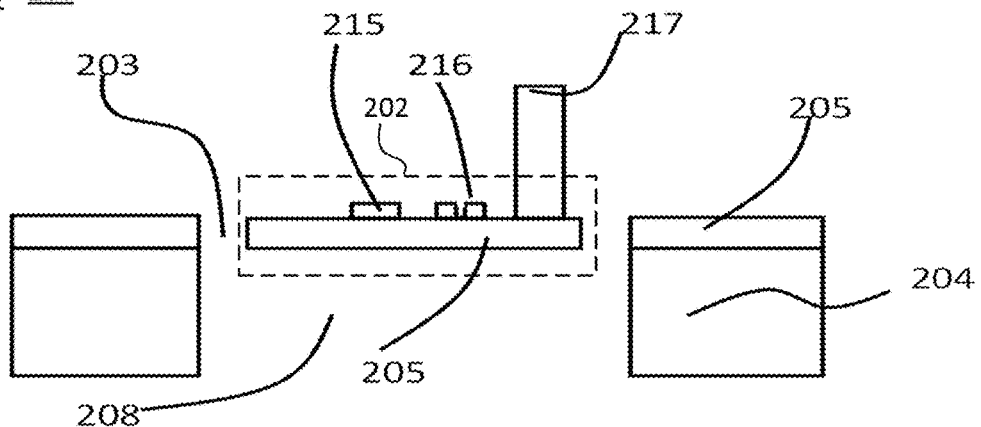
Figure 7:
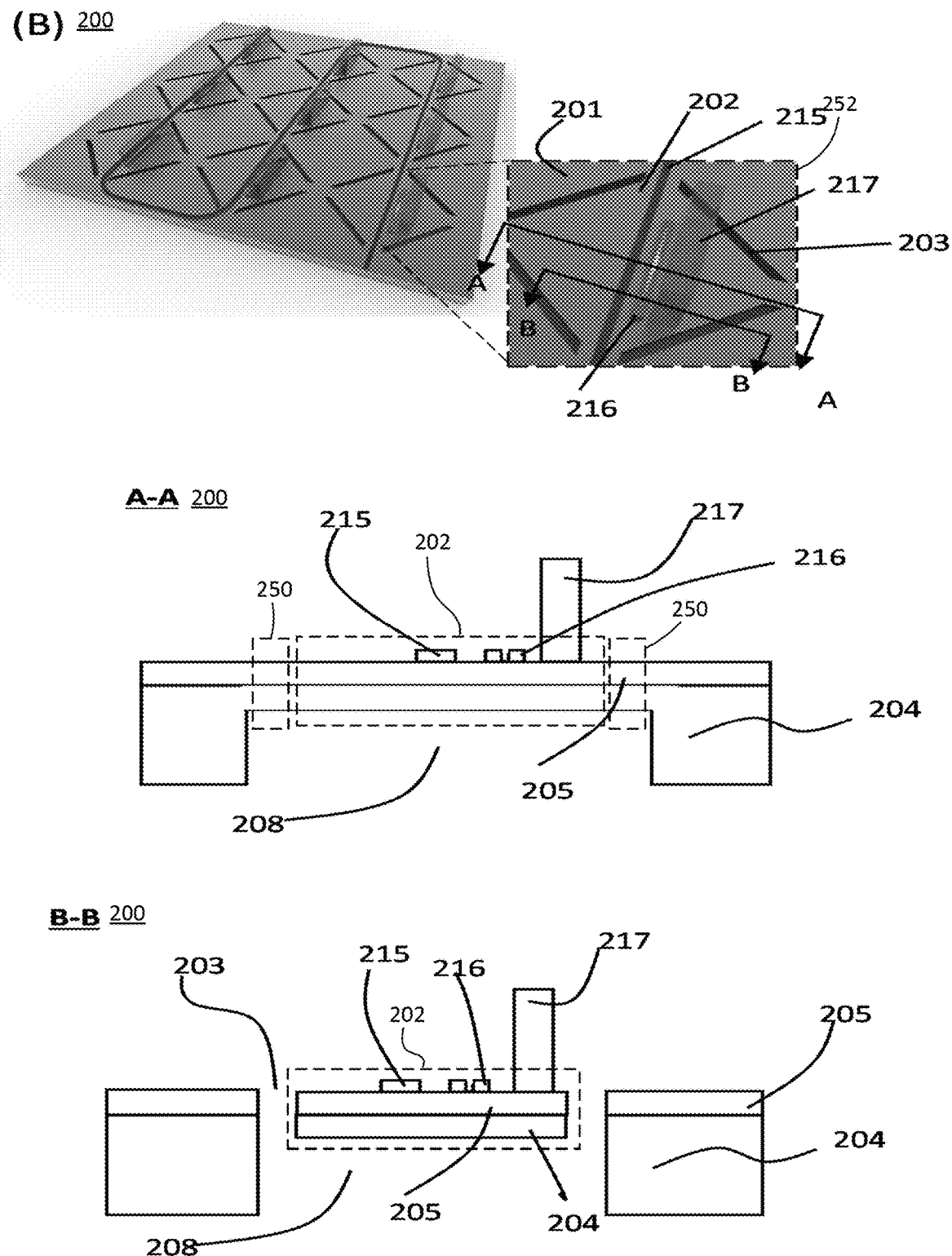
FIG. 7 shows a perspective view of a photonic bolometer and cross-sections of the photonic bolometer, according to an embodiment.
Figure 8:
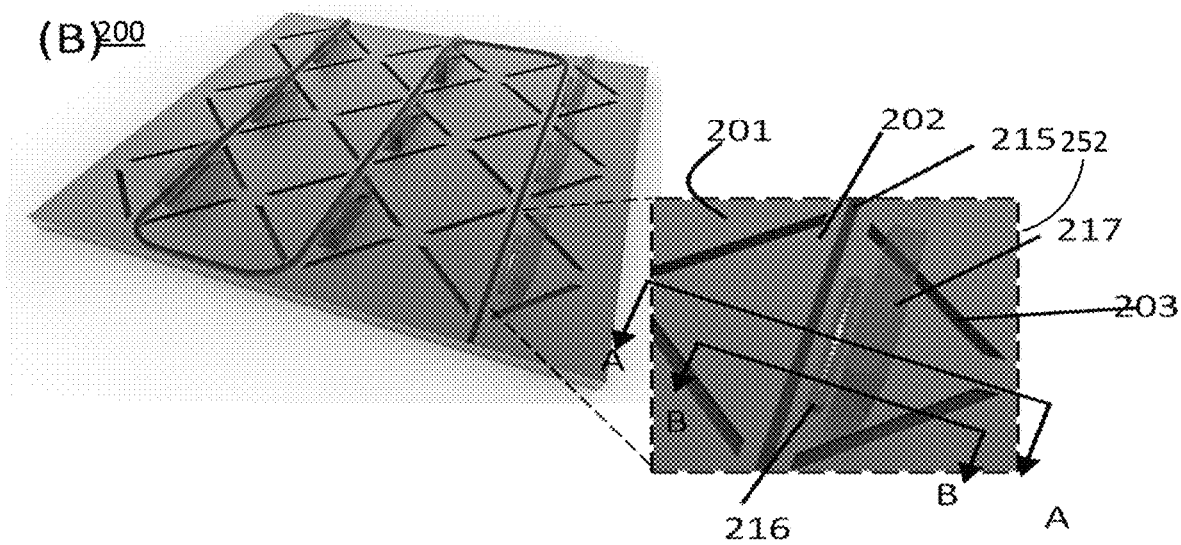
FIG. 8 shows a perspective view of a photonic bolometer and cross-sections of the photonic bolometer, according to an embodiment.
Figure 8:
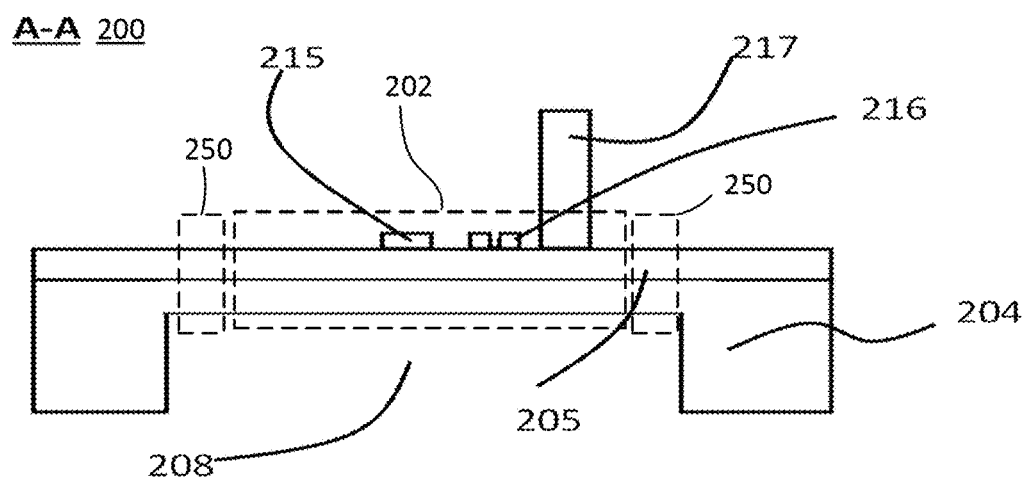
Figure 8:
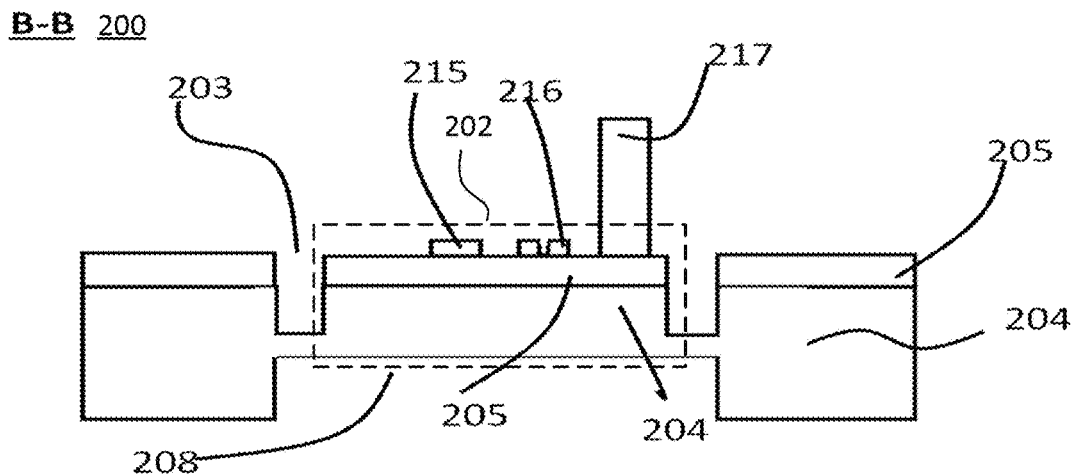
Figure 9:
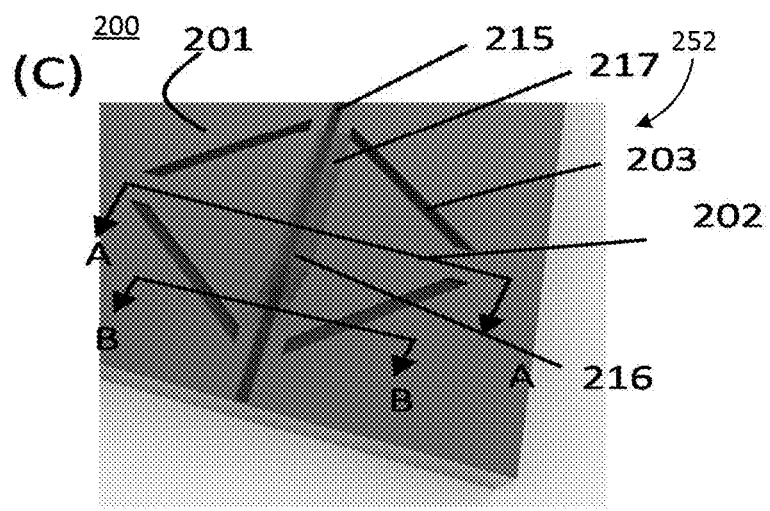
FIG. 9 shows a perspective view of a photonic bolometer and cross-sections of the photonic bolometer, according to an embodiment.
Figure 9:
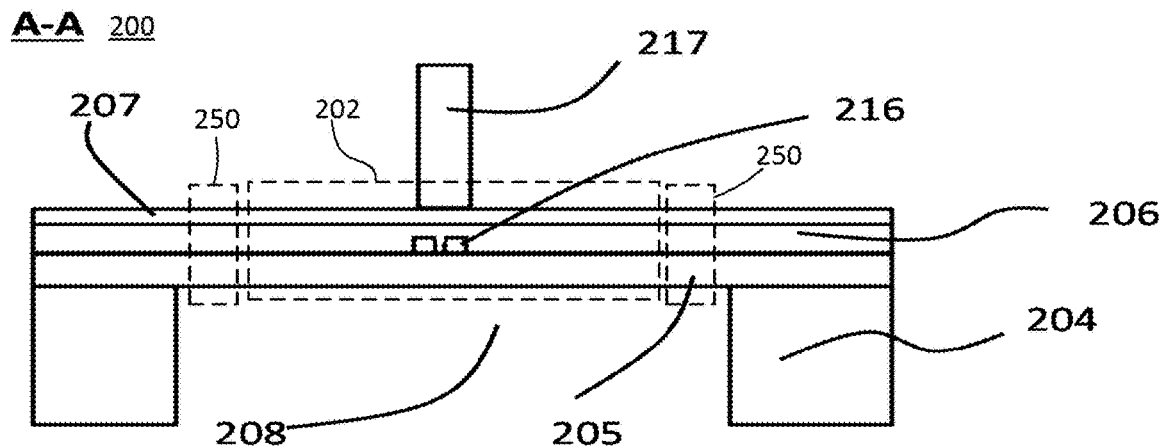
Figure 9:
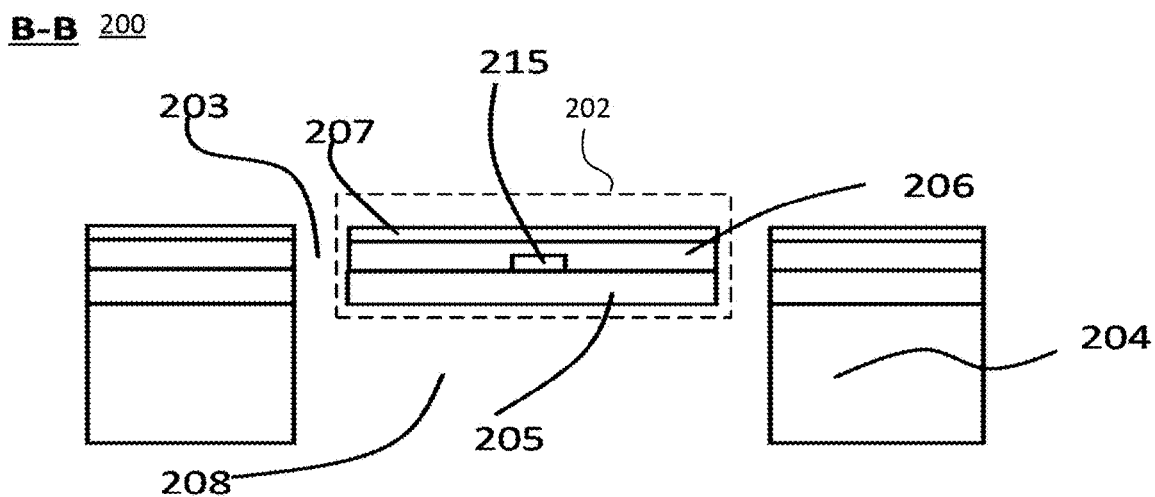
Figure 10:
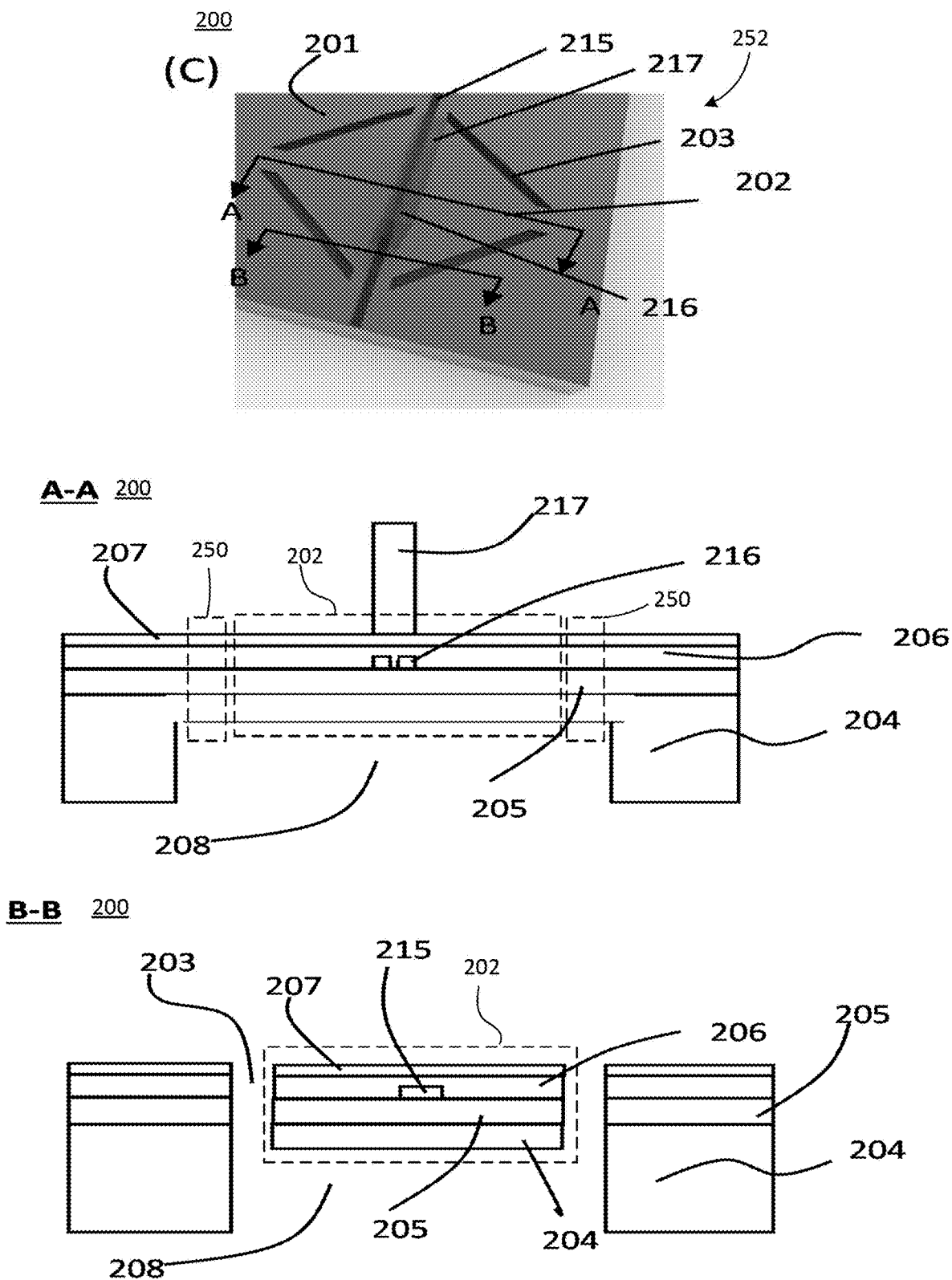
FIG. 10 shows a perspective view of a photonic bolometer and cross-sections of the photonic bolometer, according to an embodiment.
Figure 11:
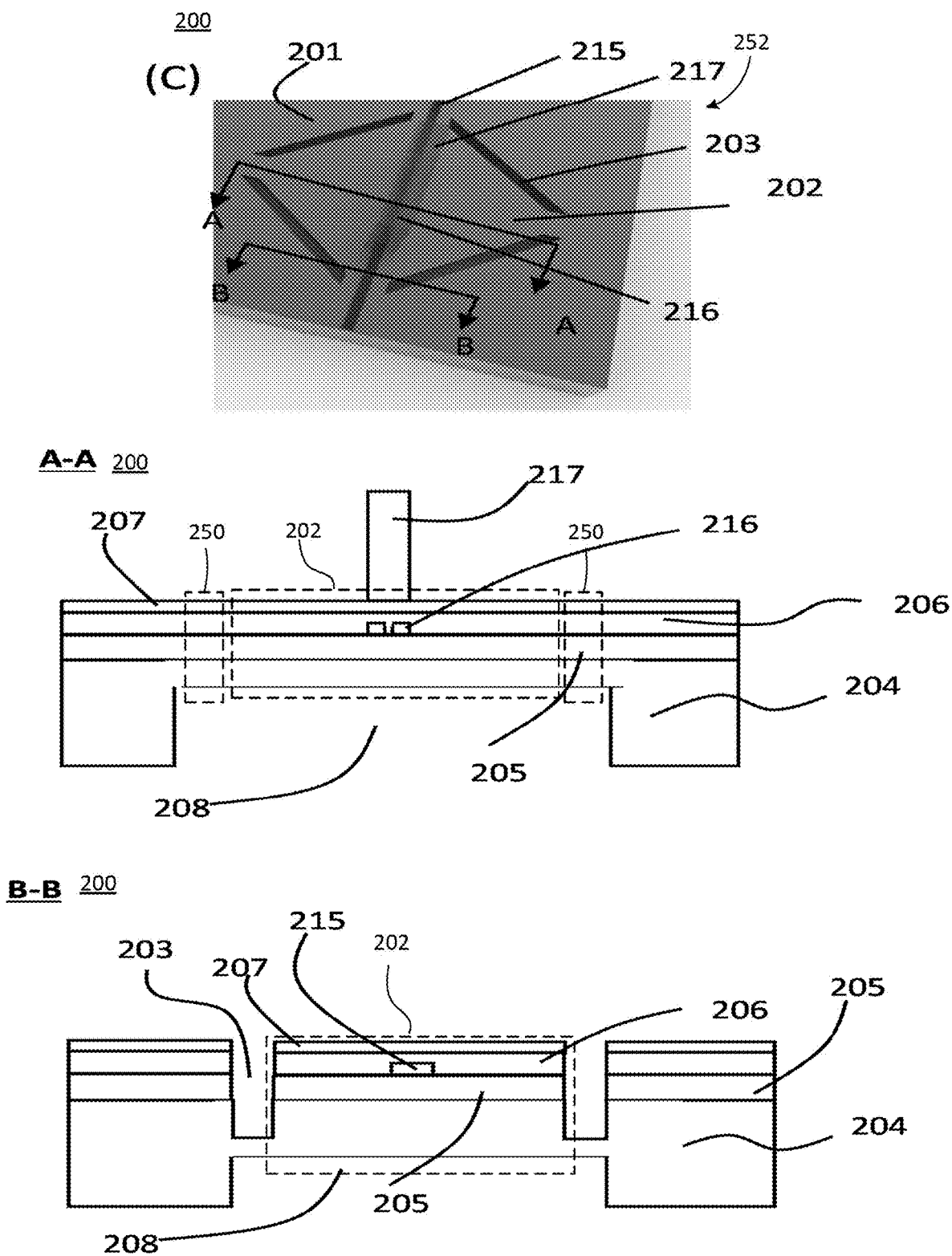
FIG. 11 shows a perspective view of a photonic bolometer and cross-sections of the photonic bolometer, according to an embodiment.
Figure 12:
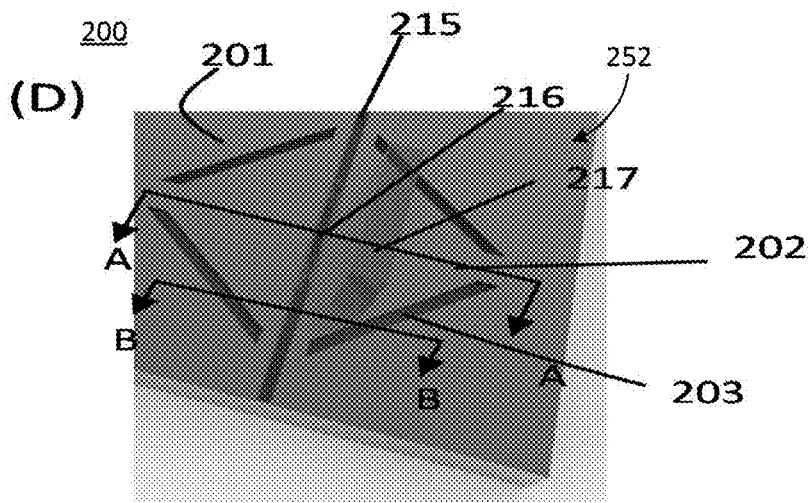
FIG. 12 shows a perspective view of a photonic bolometer and cross-sections of the photonic bolometer, according to an embodiment.
Figure 12:
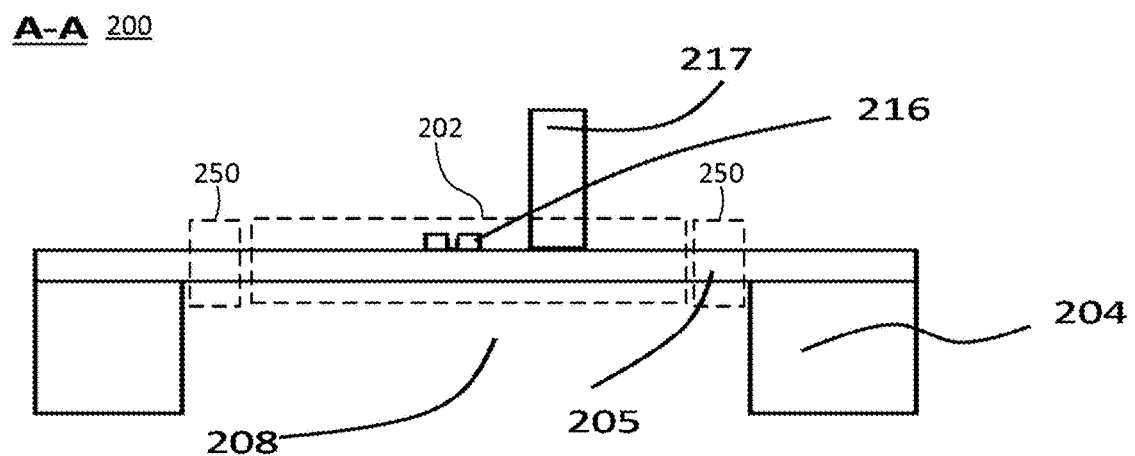
Figure 12:
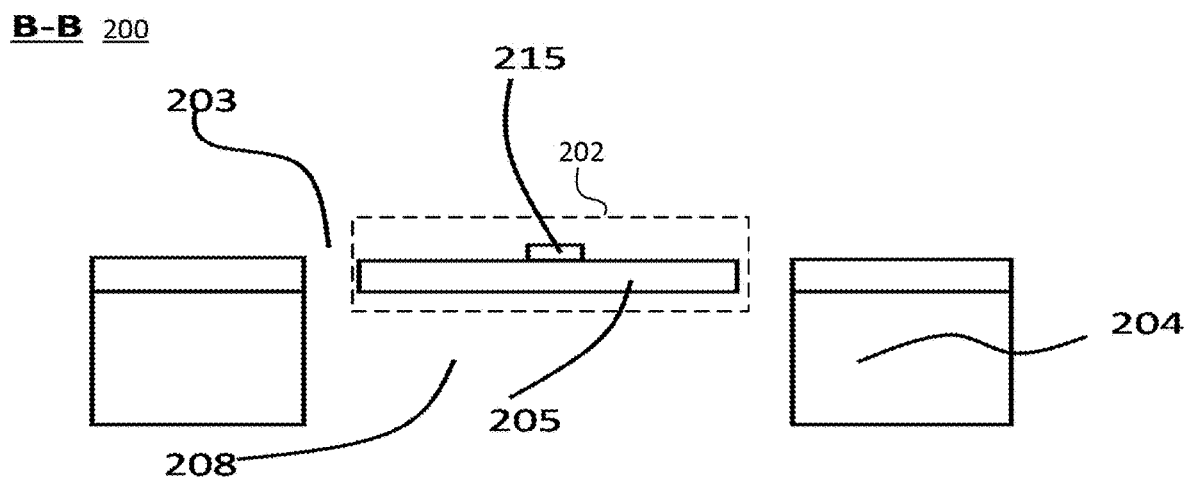
Figure 13:
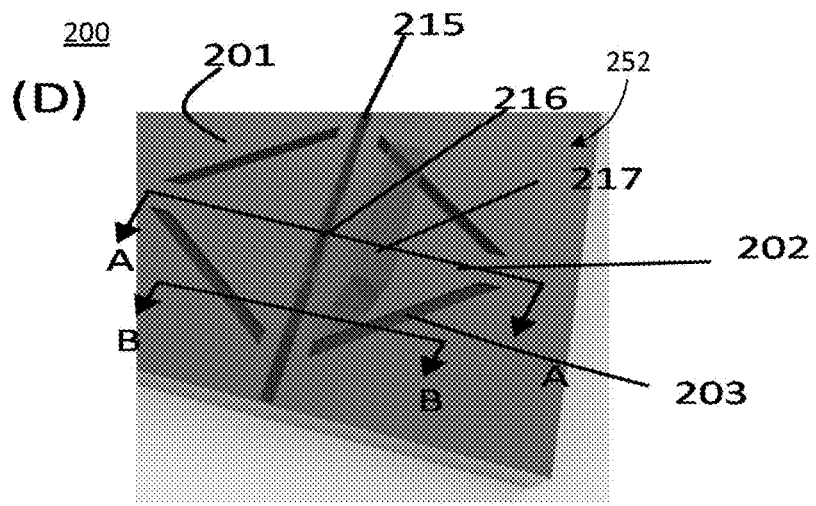
FIG. 13 shows a perspective view of a photonic bolometer and cross-sections of the photonic bolometer, according to an embodiment.
Figure 13:
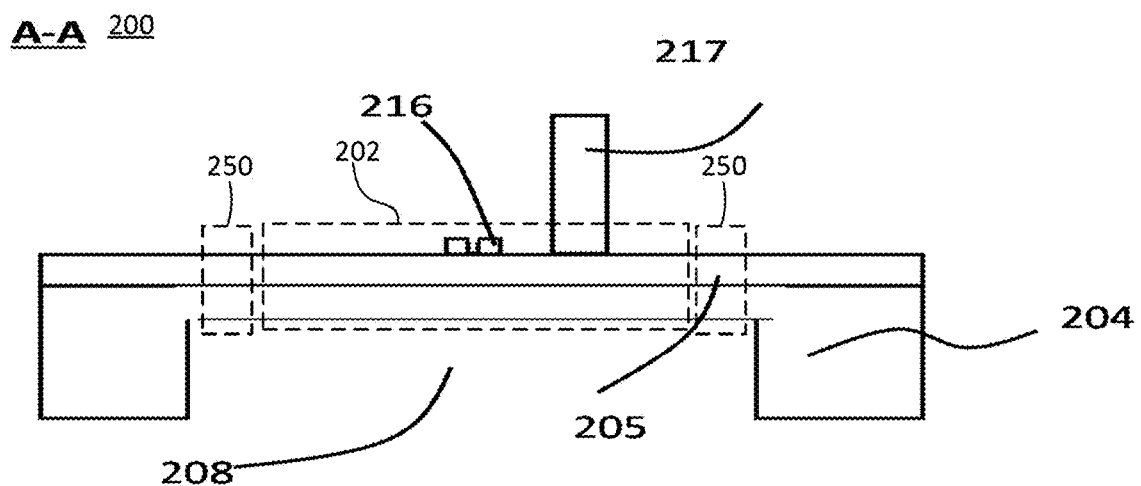
Figure 13:
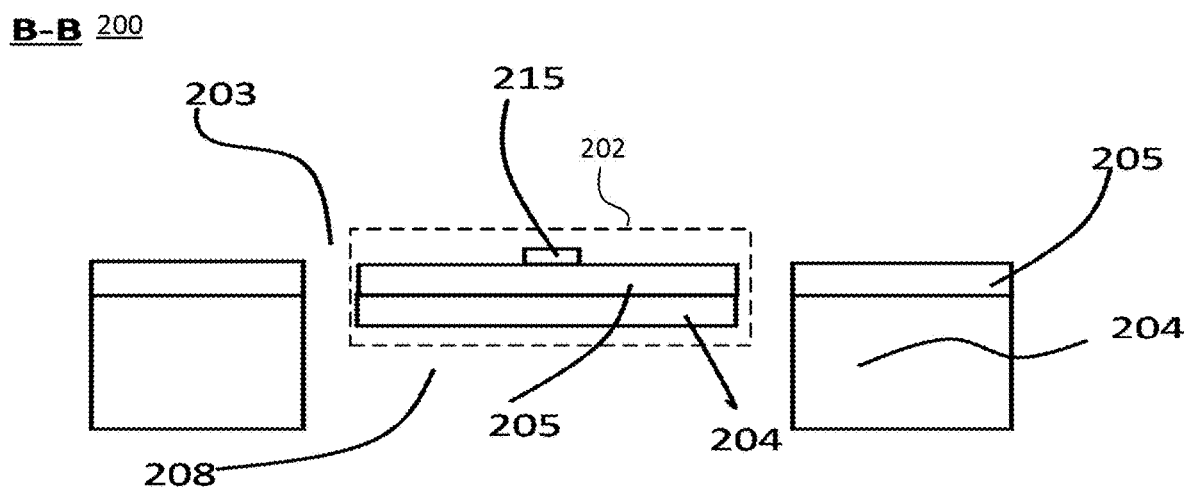
Figure 14:
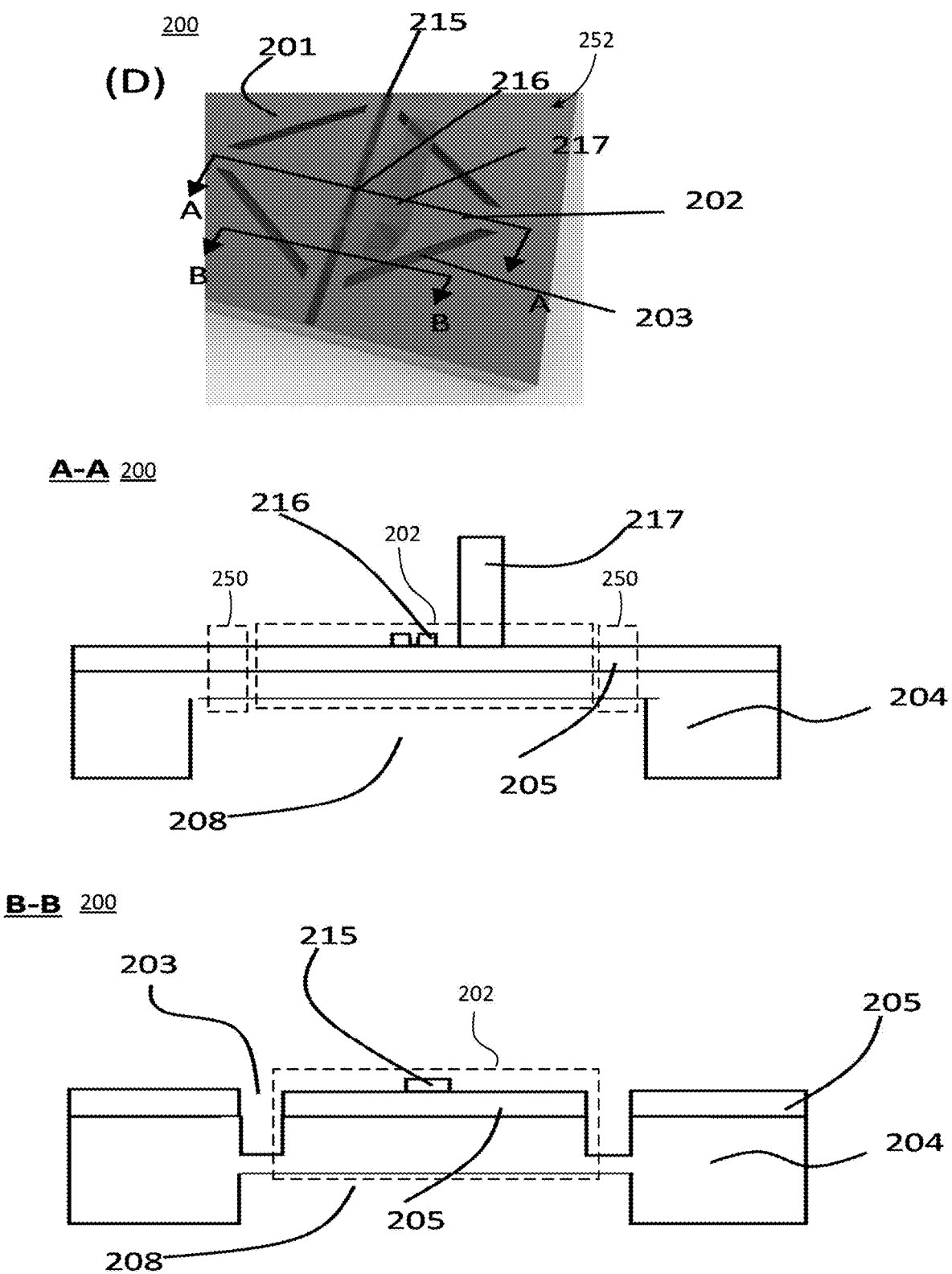
FIG. 14 shows a perspective view of a photonic bolometer and cross-sections of the photonic bolometer, according to an embodiment.
Figure 15:
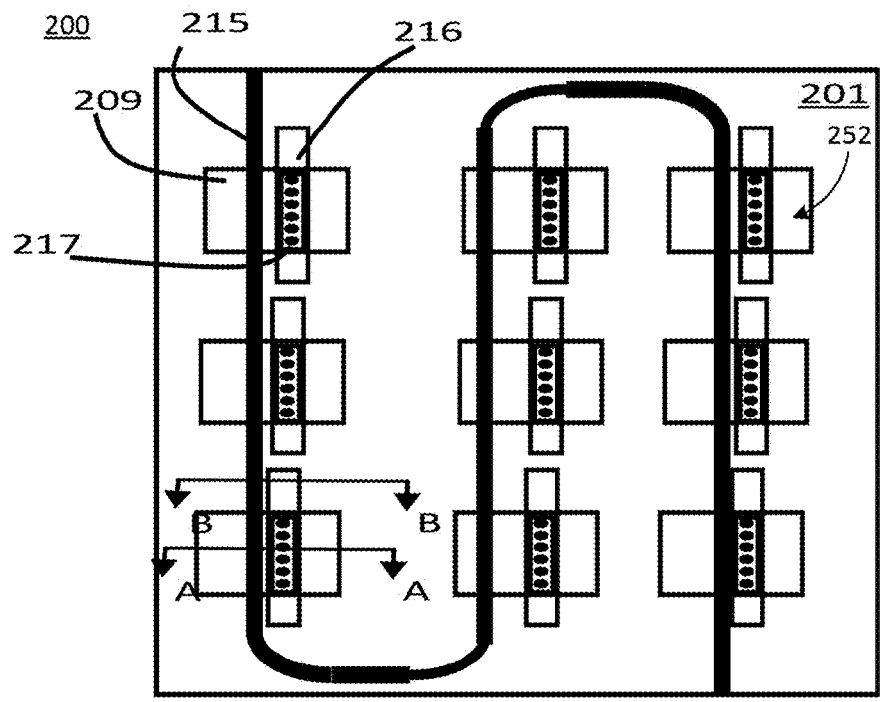
FIG. 15 shows a perspective view of a photonic bolometer that includes an array of photonic bolometer pixels and cross-sections of the photonic bolometer, according to an embodiment.
Figure 15:
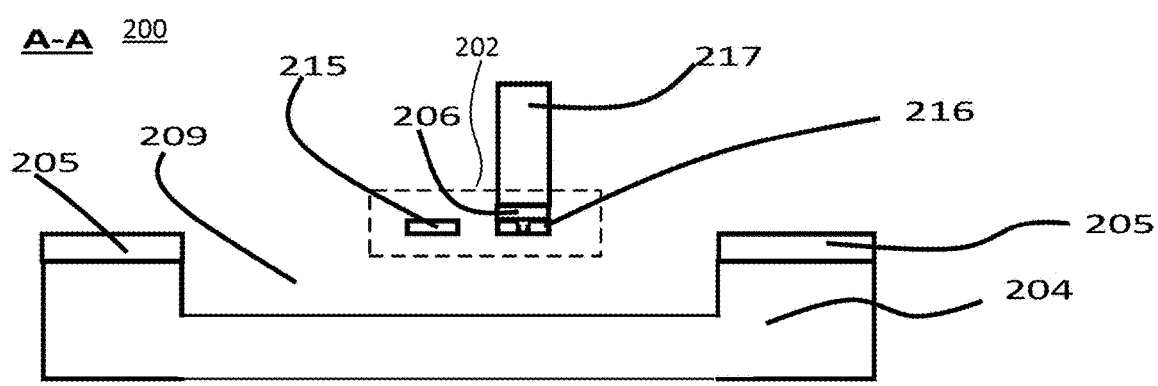
Figure 15:
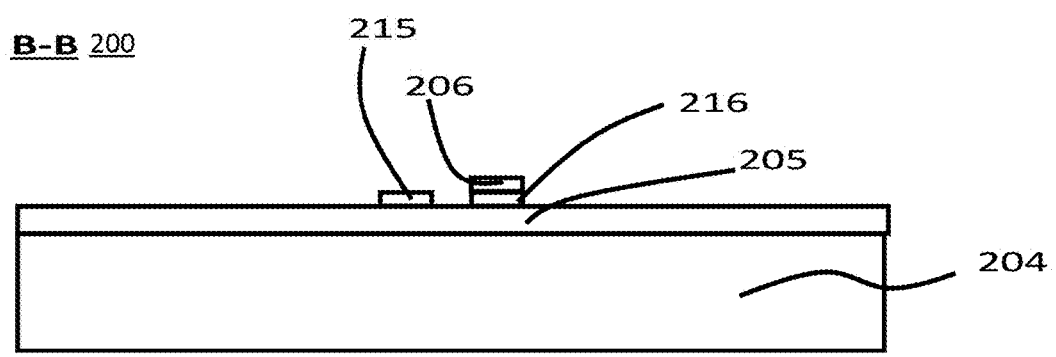

A detailed description of one or more embodiments is presented herein by way of exemplification and not limitation.

Conventional microbolometers use thermistors materials such as vanadium oxide or amorphous silicon to read out temperature electrically. Such materials are incompatible with high temperature processes. In a departure from conventional articles, photonic bolometer 200 described herein overcomes this technical deficiency of conventional microbolometers and senses changes in temperature of a bolometer element that absorbs incident radiation, e.g., by vertically aligned carbon nanotubes (VACNTs). It is contemplated that VACNTs withstand high temperatures and can be made at 800° C. Advantageously, VACNTs are highly photon absorbing (>99%) and extremely broadband (e.g., from 0.2 µm to 200 µm), unlike traditional microbolometer interference filters that are narrow band (typically 8-14 µm). Beneficially, photonic bolometer 200 can include a photonic temperature sensor that is compatible with 800° C. VACNT growth and provides easy integration of carbon nanotube absorbing elements in a microbolometer array for the first time. Moreover, photonic bolometer 200 provides thermal imaging beyond 20 µm, which is currently not possible. Past attempts at developing such a bolometer array have been hindered by incompatibility of conventional thermistor technology with the 800° C. growth temperature of VACNTs. However, the photonic temperature sensor allows for integration of carbon nanotube absorbers in photonic bolometer 200.

It has been discovered that photonic bolometer 200 measure radiation incident upon photon absorber 217 of photonic bolometer 200 over a broad frequency range, e.g., from ultraviolet wavelengths (~0.2 µm) to far infrared wavelengths (~200 µm) of the radiation. Photon absorber 217 produces heat from the incident radiation. The heat is sensed by a photonic temperature sensor (or quantum standard) that can be fabricated from silicon-on-insulator (or other photonics semiconductor materials, e.g., silicon nitride, AlN, a III-V semiconductor, and the like). Advantageously, photonic bolometer 200 can include a plurality of chip-scale, single photonic bolmetric pixels 252 that are multiplexed and arranged in a multi-pixel array, wherein in addition to sensing the incident radiation, the array can image the extent of the incident radiation over, e.g., a two-dimensional surface area.

Photonic bolometer 200 performs broadband high-absorption photonic bolometry. In an embodiment, with reference to FIG. 1, FIG. 2, FIG. 3, FIG. 4, and FIG. 5, FIG. 6, FIG. 7, FIG. 8, FIG. 9, FIG. 10, FIG. 11, FIG. 12, FIG. 13, FIG. 14, FIG. 15, FIG. 16, and FIG. 18, photonic bolometer 200 includes: photonic chip 201; weak thermal link 250 disposed on and in mechanical communication with photonic chip 201; thermally-isolated member 202 disposed on weak thermal link 250 and in mechanical communication with the weak thermal link 250, such that weak thermal link 250 is interposed between thermally-isolated member 202 and photonic chip 201, and weak thermal link 250 thermally isolates thermally-isolated member 202 from photonic chip 201; photonic temperature sensor 216 disposed on thermally-isolated member 202 and including a resonance frequency from which a temperature of thermally-isolated member 202 is determinable and that varies with temperature of thermally-isolated member 202, wherein photonic temperature sensor 216 receives primary probe light 238 from chip waveguide 215 and produces bolometer light 244 from primary probe light 238; chip waveguide 215 disposed on thermally-isolated member 202 in optical communication with photonic temperature sensor 216 and that communicates primary probe light 238 to photonic temperature sensor 216 and that monitors transmission and storage of primary probe light 238 by photonic temperature sensor 216, wherein chip waveguide 215 receives bolometer light 244 from photonic temperature sensor 216 to determine the temperature of thermally-isolated member 202 via a change in resonance frequency of photonic temperature sensor 216; and photon absorber 217 disposed on thermally-isolated member 202 in thermal communication with photonic temperature sensor 216 and that receives incident radiation light 236, increases temperature due to absorption of incident radiation light 236, heats photonic temperature sensor 216 in response to receipt of incident radiation light 236, and changes the resonance frequency of photonic temperature sensor 216 in response to receiving incident radiation light 236.

In an embodiment, photonic bolometer 200 includes isolation trench 203 bounded by photonic chip 201 and thermally-isolated member 202, such that isolation trench 203 is interposed between photonic chip 201 and thermally-isolated member 202. In an embodiment, isolation trench 203 surrounds the thermally-isolated member 202.

In an embodiment, photonic bolometer 200 includes a reference phonic thermometer disposed on photonic chip 201 to measure a temperature of substrate 204 without measuring the temperature of thermally-isolated member 202.

In an embodiment, weak thermal link 250 mechanically interconnects thermally-isolated member 202 and photonic chip 201.

Figure 16:
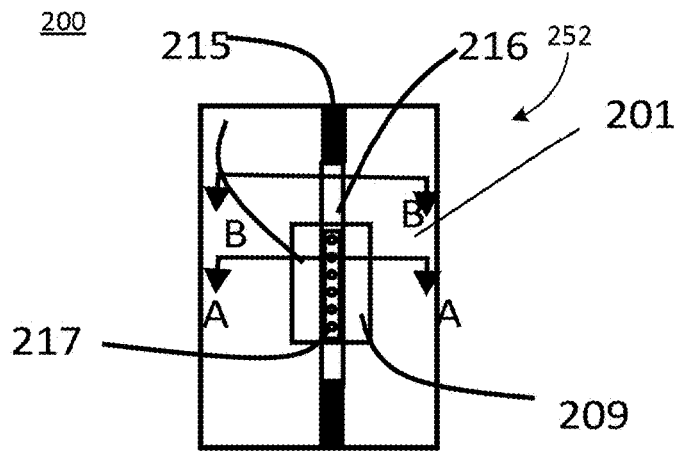
FIG. 16 shows a perspective view of a photonic bolometer that includes an array of photonic bolometer pixels and cross-sections of the photonic bolometer, according to an embodiment.
Figure 16:
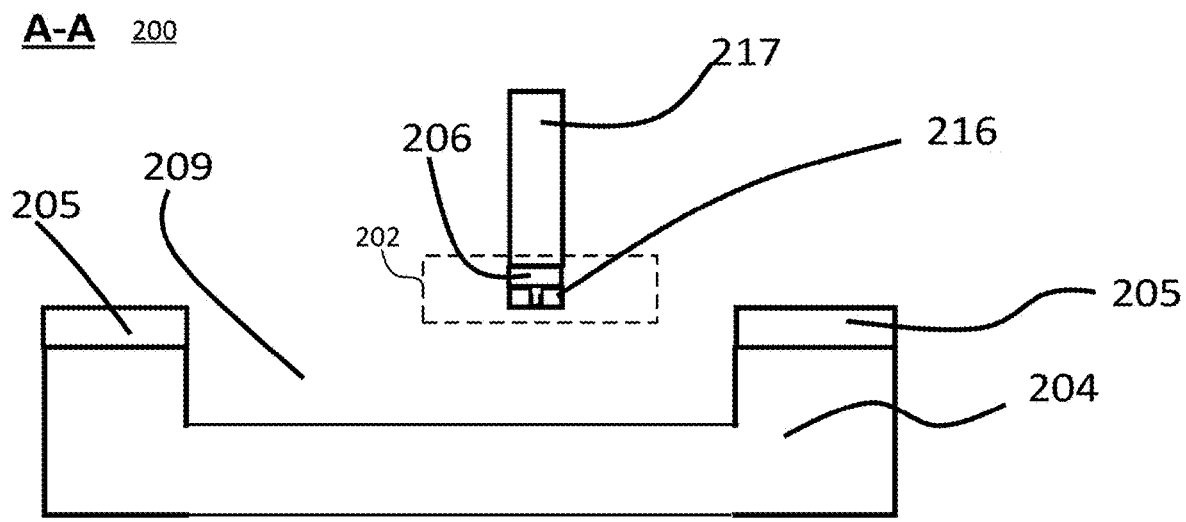
Figure 16:
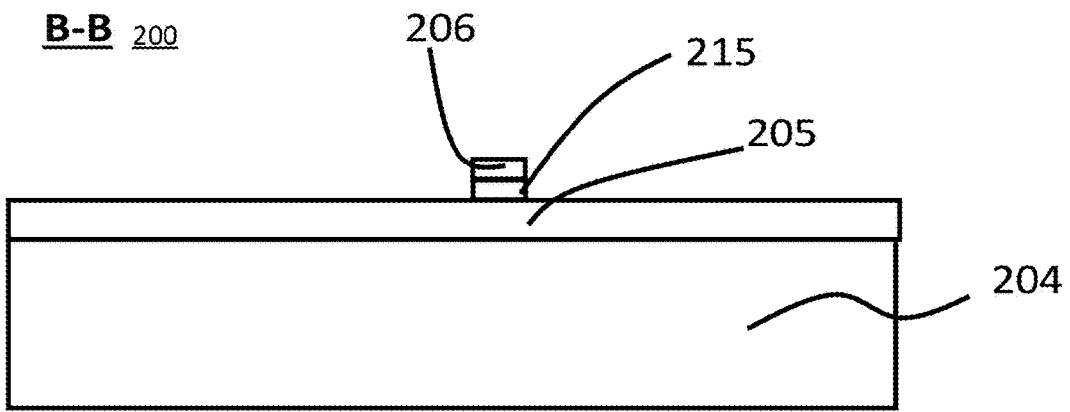

In an embodiment, photonic bolometer 200 includes undercut 209 arranged between substrate 204 and thermally-isolated member 202, e.g., as shown in FIG. 16. In an embodiment, undercut 209 spaces apart substrate 204 and thermally-isolated member 202 so that chip waveguide 215, photonic temperature sensor 216, and photon absorber 217 are suspended above and relative to substrate 204, with chip waveguide 215 extending from opposing portions of oxide dielectric 205, which are interposed between chip waveguide 215 and substrate 204, over substrate 204, and photon absorber 217 is disposed on photonic temperature sensor 216.

Various arrangements of chip waveguide 215, photonic temperature sensor 216, and photon absorber 217 in thermally-isolated member 202 are contemplated. In an embodiment, photonic temperature sensor 216 is interposed between chip waveguide 215 and photon absorber 217. In an embodiment, photonic temperature sensor 216 and photon absorber 217 are disposed proximate to chip waveguide 215, and photon absorber 217 is disposed on photonic temperature sensor 216 so that photonic temperature sensor 216 is interposed between photon absorber 217 and thermally-isolated member 202.

In an embodiment, photonic chip 201, thermally-isolated member 202, and weak thermal link 250 independently comprise a semiconductive material. In an embodiment, photonic temperature sensor 216 includes a semiconductive material. In an embodiment, photonic temperature sensor 216 includes a photonic crystal cavity, a ring resonator, or a disk resonator, such that the resonance frequency of photonic temperature sensor 216 is sensitive to temperature. In an embodiment, photon absorber 217 includes vertically aligned carbon nanotubes.

In an embodiment, photonic bolometer 200 includes cladded dielectric 206 disposed on photonic temperature sensor 216, such that photonic temperature sensor 216 is interposed between cladded dielectric 206 and substrate 204.

In an embodiment, weak thermal link 250, thermally-isolated member 202, photonic temperature sensor 216, and photon absorber 217 are arranged as a single photonic bolometric pixel 252 in photonic bolometer 200. In an embodiment, photonic bolometer 200 further includes additional photonic bolometric pixels 252 arranged in an array. In an embodiment, chip waveguide 215 extends along photonic bolometer 200 so that chip waveguide 215 is in optical communication with each photonic temperature sensor 216 in each photonic bolometric pixel 252 and: communicates primary probe light 238 to each photonic temperature sensor 216 in each photonic bolometric pixel 252; and receives bolometer light 244 from each photonic temperature sensor 216 in each photonic bolometric pixel 252, such that the at least a two-dimensional temperature map is obtained across photonic bolometer 200 from bolometer light 244 from each photonic temperature sensor 216 in each photonic bolometric pixel 252. The temperature map can be a spatial map of incident radiation light 236 that is absorbed by the plurality of photon absorbers 217 disposed in the array of photonic bolometric pixels 252.

In an embodiment, photonic bolometer 200 can include additional layers. Such layers can include oxide dielectric 205, dielectric membrane 207, dielectric membrane 207 among others that can be used for electrical insulation or selective conduction, optical or thermal isolation and the like. It should be appreciated that an order of the layers and a number of repeats of any of these layers in a stacked structure can occur based on a desired application or environment of operation of photonic bolometer 200. For example, with reference to FIG. 3, dielectric membrane 207 can be interposed between photon absorber 217 that is disposed on photonic temperature sensor 216. Photonic chip 201 can include substrate 204 and oxide dielectric 205 disposed on substrate 204. The thermally-isolated member 202 has a very weak thermal link to photonic chip 201 and can include dielectric membrane 207, etch cavity 208, undercut 209, or isolation trench 203. Further, photonic temperature sensor 216 can be, e.g., a photonic crystal cavity, ring resonator, or disk resonator, such that the resonance frequency thereof is sensitive to temperature. Since photonic temperature sensor 216 is disposed on thermally-isolated member 202, the temperature rise sensed by photonic temperature sensor 216 is determined using optical frequency metrology. In an embodiment, photonic temperature sensor 216 is coated, e.g., top-covered, with cladded dielectric 206.

Probe light 237 is coupled to and from photonic temperature sensor 216 via chip waveguide 215 disposed proximate to photonic temperature sensor 216. Vertically aligned carbon nanotubes (VACNTs) can be grown as photon absorber 217 over photonic temperature sensor 216, providing for an isothermal pixel structure, wherein incident radiation light 236 is absorbed by photon absorber 217 and converted therewith to heat. VACNTs in photon absorber 217 absorb incident radiation light 236 (e.g., light) and transform it into heat, raising the temperature of thermally-isolated member 202 (but not ref a201) and sensed by photonic temperature sensor 216.

In an embodiment, an additional photonic temperature sensor 216 (referred to herein as a reference photonic thermometer) and chip waveguide 215 can be disposed on photonic chip 201, external to thermally-isolated member 202, wherein the reference phonic thermometer measures a bulk or substrate (reference) temperature of photonic chip 201. The temperature difference between the reference photonic temperature sensor 216 and photonic temperature sensor 216 give the temperature rise solely due to absorbed incident radiation light 236, illumination temperature fluctuation of the surrounding environment where photonic chip 201 is located.

Substrate 204 can include a material that can be processed (e.g., micromachined, including lithography and the like) to form a support structure for photonic temperature sensor 216. Exemplary substrates 204 include wafers or dies of silicon, sapphire, silicon carbide or III-V materials. A thickness of substrate 204 can be from 100 μm to 10 mm, specifically from 250 μm to 1 mm, and more specifically from 550 μm to 680 μm. In an embodiment, substrate 204 includes a semiconductor. An exemplary semiconductor is an element from group 11, 12, 13, 14, 15, or 16 (IUPAC nomenclature, which respectively is identical to group I, II, III, IV, V, or VI) of the periodic table such as a Si, Ga, Ge, As, In, Sn, Sb, Te, At, Hf, Zn, and the like, or a combination thereof. According to an embodiment, substrate 204 is a compound semiconductor such as SiC, SiGe, GaN; a group 13-15 (also referred to as a group III-V) semiconductor such as AlSb, AlAs, Aln, AlP, BN, GaSb, GaAs, GaN, GaP, InSb, InAs, InN, InP, and the like; a group 12-16 (group II-VI) semiconductor such as CdSe, CdS, CdTe, ZnO, ZnSe, ZnS, ZnTe, and the like; a group 11-17 (group I-VII) semiconductor such as CuCl and the like; a group 14-16 (group IV-VI) semiconductor such as PbS, PbTe SnS, and the like; a layer semiconductor such as $PbI_2$, $MoS_2$, GaSe, and the like; an oxide semiconductor such as CuO, $Cu_2O$, and the like; (Al,Ga)N, (Al,Ga)As, (In,Ga)As, (Al,Ga)Sb, (In,Ga)Sb, as well as nitride, arsenide, antimonide quaternary III-V alloys, or a combination comprising at least one of the foregoing. Examples of II-VI alloys include, but are not limited to CdSe, CdTe, CdS, ZnSe, and combinations thereof. Examples of Group III-V ternary alloys include, but are not limited to, (Ga,Al)As, (In,Ga)As, and combinations thereof. Exemplary Group III-V quaternary alloys include (Ga,In)(As,P), (In,Al,Ga)Sb, and the like. Exemplary Group III-nitride alloys include (Ga,Al)N, (Ga,In)N, (Al,In)N, (Ga,Al,In)N, and combinations thereof. Quaternary alloys of the above may also be employed.

Substrate 204 also can include a supplemental element such as C, H, N, Li, Na, K, Mg, Ca, Sr, Ba, Bi, B, Al, P, S, O, and the like in an amount typically less than an amount of the semiconductor. In an embodiment, common substrate 204 includes silicon, and the silicon is optionally doped. According to an embodiment, the semiconductor is an intrinsic semiconductor or an extrinsic semiconductor doped with a selected dopant, e.g., a p-dopant or an n-dopant. In one embodiment, the substrate includes a p-dopant. In another embodiment, substrate 204 includes an n-dopant. In a particular embodiment, substrate 204 is p-doped Si. In one embodiment, substrate 204 is n-doped Si. Substrate 204 can be produced from, e.g., commercially available semiconductor grade p-doped Si having a particular crystalline orientation, e.g., having Miller indices <111>, <100>, and the like. Substrate 204 can be amorphous, polycrystalline, or a single crystal. In an embodiment, substrate 204 has a stacked structure that includes a plurality of semiconductor layers such as by forming films as SiGe/Si/SiGe/Si on a Si substrate. In some embodiments, substrate 204 includes crystalline domains among amorphous material.

In an embodiment, substrate 204 includes a glass, Pyrex, sapphire, polymer, ceramic, or an electrically conductive material, e.g., a metal. Substrate 204 can be electrically conductive, semiconductive, or electrically insulating. Substrate 204 can include a plurality of layers such oxide dielectric 205 and top-cladded dielectric oxide 206 on a base layer, e.g., of silicon.

Oxide dielectric 205 can be disposed on substrate 204 to isolate the photonic temperature sensor 216 from substrate 204. The oxide dielectric 205 can include an oxide of an element deposited on substrate 204 or independently can be an oxide of a semiconductor material such as $SiO_2$. In an embodiment, substrate 204 includes Si, and oxide dielectric 205 includes silicon dioxide ($SiO_2$). Additional oxide dielectric 205 materials include gallium oxide ($GaO_3$), aluminum oxide ($Al_2O_3$), or alloys thereof, oxides of compounds from Groups III and V or alloys thereof, and the like. Exemplary oxides in oxide dielectric 205 also include ZnO, $HfO_2$, $SnO_2$, $In_2O_3$, $Zn_2SnO_4$, $Ga_2O_3$, $Al_2O_3$, and the like. In an embodiment, oxide dielectric 205 is produced by oxidation of a portion of substrate 204 to produce the semiconductor oxide. According to one embodiment, oxide dielectric 205 is a product of rapid thermal oxidation of substrate 204 so that the oxide (the dielectric layer) is derived from substrate 204. In another embodiment, the oxide dielectric 205 is a product of low temperature oxidation of substrate 204 to produce an oxide. In a further embodiment, oxide dielectric 205 is a product of depositing the oxide on substrate 204, which may or may not involve oxidation of substrate 204. Moreover, oxide dielectric 205 can be bonded to substrate 204. In an embodiment, oxide dielectric 205 includes $SiO_2$ as the oxide, which is a product of oxidation of substrate 204 that includes Si. In some embodiments, oxide dielectric 205 includes a semiconductor oxide, a ceramic (e.g., ZrO2, Al2O3, SiC, Si3N4, BN, BaTiO3, and the like), a glass, a polymer, or a combination thereof. In some embodiments, the dielectric oxide includes an organic compound such as a polymer, e.g., cellulose, poly(methyl methacrylate), and the like.

A thickness of oxide dielectric 205 can be from 0.25 µm to 10 µm, specifically from 0.5 µm to 5 µm, and more specifically from 1 µm to 3 µm.

Cladded dielectric 206 can include the same composition, properties and function as oxide dielectric 205. Moreover, the cladded dielectric 206 can be an encapsulation layer that seals photonic temperature sensor 216 from environmental factors such as humidity and moisture, dust, chemical depositions that can change the effective refractive index of photonic temperature sensor 216, and the like. Furthermore, cladded dielectric 206 can optically isolate photonic temperature sensor 216 from photon absorber 217 grown over cladded dielectric 206, directly on top of photonic temperature sensor 216. In an embodiment, cladded dielectric 206 includes a product of depositing the oxide on substrate 204. Moreover, cladded dielectric 206 can be bonded to photonic temperature sensor 216.

Waveguide 215 receives primary probe light 238 and bolometer light 244 in communication with photonic temperature sensor 216. Waveguide 215 guides light along a path and can be a structure on or over a substrate which guides light along the axial direction and confines it in the transverse directions. Exemplary waveguides 215 include rib waveguides and ridge waveguides. Moreover, waveguide 215 can include coupling elements to light into and out of the waveguide 215, such as Bragg grating couplers or inverse tapers, and the like. A size, i.e., a transverse cross-section dimension relative to a propagation path of primary probe light 238 in waveguide 215, can be from 20 nm to 20 µm, specifically from 50 nm to 5 µm, and more specifically from 200 nm to 1 µm. A transmission loss of waveguide 215 can be from 0.1 dB/cm to 50 dB/cm, specifically from 0.5 dB/cm to 10 dB/cm, and more specifically from 1 dB/cm to 4 dB/cm at a wavelength from 500 nm to 10 µm, specifically from 750 nm to 4 µm, and more specifically from 1 µm to 2.5 mm. In an embodiment, waveguide 215 guides light along a path; can have dimensions from 300 nm to 1 µm width, 200 nm to 500 nm height; can include silicon and similar materials; and can operate at a wavelength from 1 µm to 2.5 µm Photonic temperature sensor 216 can be formed according to methods described in US patent 220/0103594A1, which is incorporated by reference herein in its entirety.

The thermally isolated area 202 has a very weak thermal link to photonic chip 201 by weak thermal link 250 and can include thin suspended membrane 207 that is thermally isolated from the bulk of chip 201 and supported by tethers or legs that act as weak thermal links 250 to the bulk of chip 201. Moreover, the thermally isolated area 202 can be a portion/surface area on a chip that is surrounded by isolation trenches 203. These isolation trenches 203 are a weak thermal link to chip 201. The thermal isolation area 202 supports both a photonic thermometer 216, VACNTs 217, and a portion of the waveguide 215. Furthermore, thermally isolation area 202 can include etch cavity 208, wherein etch cavity 208 is etched in substrate 204. Furthermore, thermally-isolated member 202 can include undercut 209 so that photonic temperature sensor 216, wherein photonic temperature sensor 216 is suspended over undercut 209.

VACNTs in photon absorber 217 absorb incident radiation light 236 that can be, e.g., from ultraviolet (~0.2 µm) to long-range infrared (~200 µm) and transform it into heat that is sensed by photonic temperature sensor 216 fabricated from silicon-on-insulator (or other photonics semiconductor materials, e.g. silicon nitride, AlN, III-V, and the like), and is thermally disconnected from the photonic chip 201 by suspending it with legs or on cladded dielectric 206.

Isolation trench 209 can be a gap between thermally-isolated member 202 and photonic chip 201 that is empty (e.g., an air gap) or filled with a thermally insulating material so that thermally-isolated member 202 is thermally isolated from photonic chip 201. Accordingly, when thermally-isolated member 202 is heated due to electrical current causing Joule heating of photon absorber 217, even though thermally-isolated member 202 is heated, photonic chip 201 maintains its temperature without a temperature increase or having an insignificant increase in temperature.

In an aspect, photonic temperature sensor 216 has an optical resonance frequency that is sensitive to temperature. The temperature rise sensed by photonic temperature sensor 216 is determined using frequency metrology. The photonic temperature sensor 216 can be encapsulated, shielding it from the environment effects such as humidity. Moreover, photonic temperature sensor 216 can be fabricated from silicon, silicon nitride (silicon- or silicon nitride-on-insulator platform), AlN, $TiO_2$, GaAs, or other semi-conductive materials.

Photonic bolometer 200 can be made of various elements and components that are microfabricated, microfabricated or nanofabricated. Elements of photonic bolometer 200 can be various sizes and can be made of a material that is physically or chemically resilient in an environment in which photonic bolometer 200 is disposed. Exemplary materials include a metal, ceramic, thermoplastic, glass, semiconductor, and the like. Some of the elements of photonic bolometer 200 can be made of the same or different material and can be monolithic in a single physical body or can be separate members that are physically joined.

Photonic bolometer 200 can be made in various ways. It should be appreciated that photonic bolometer 200 includes a number of optical, electrical, or mechanical components, wherein such components can be interconnected and placed in communication (e.g., optical communication, electrical communication, mechanical communication, and the like) by physical, chemical, optical, or free-space interconnects. The components can be disposed on mounts that can be disposed on a bulkhead for alignment or physical compartmentalization. As a result, photonic bolometer 200 can be disposed in a terrestrial environment or space environment. Elements of photonic bolometer 200 can be formed from silicon, silicon nitride, and the like although other suitable materials, such ceramic, glass, or metal can be used. According to an embodiment, the elements of photonic bolometer 200 are formed using 3D printing although the elements of photonic bolometer 200 can be formed using other methods, such as injection molding or machining a stock material such as block of material that is subjected to removal of material such as by cutting, laser oblation, chemical vapor deposition, etching, and the like. Accordingly, photonic bolometer 200 can be made by additive or subtractive manufacturing. In an embodiment, elements of photonic bolometer 200 are selectively etched to remove various different materials using different etchants and photolithographic masks and procedures. The various layers thus formed can be subjected to joining by bonding to form photonic bolometer 200.

Figure 19:
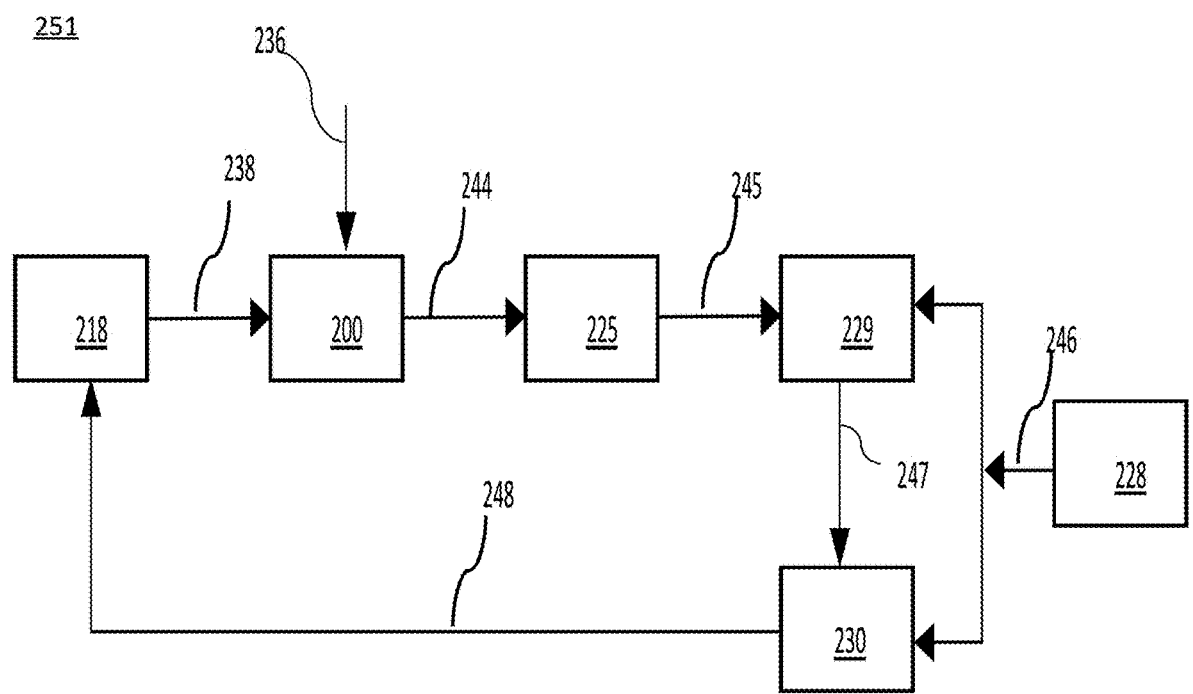
FIG. 19 shows a photonic bolometry system, according to an embodiment.
Figure 20:
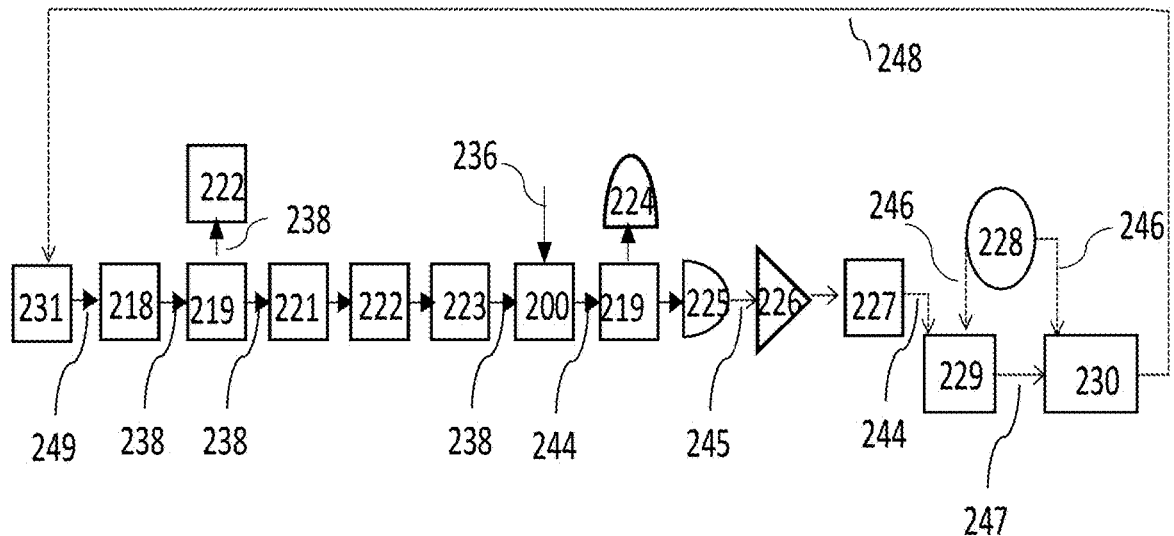
FIG. 20 shows a photonic bolometry system, according to an embodiment.
Figure 20:
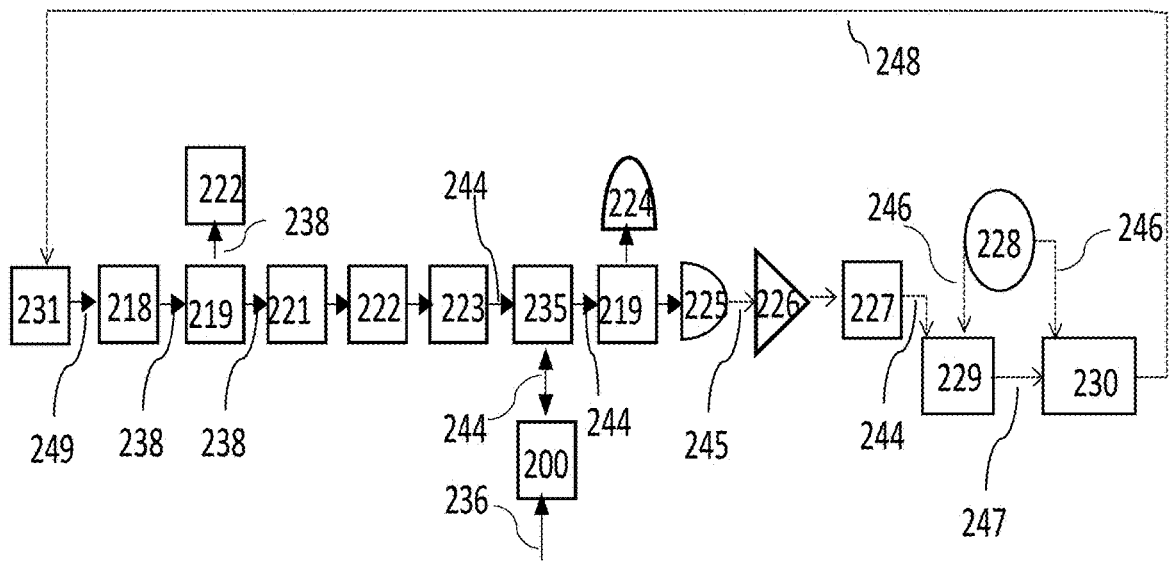
Figure 21:
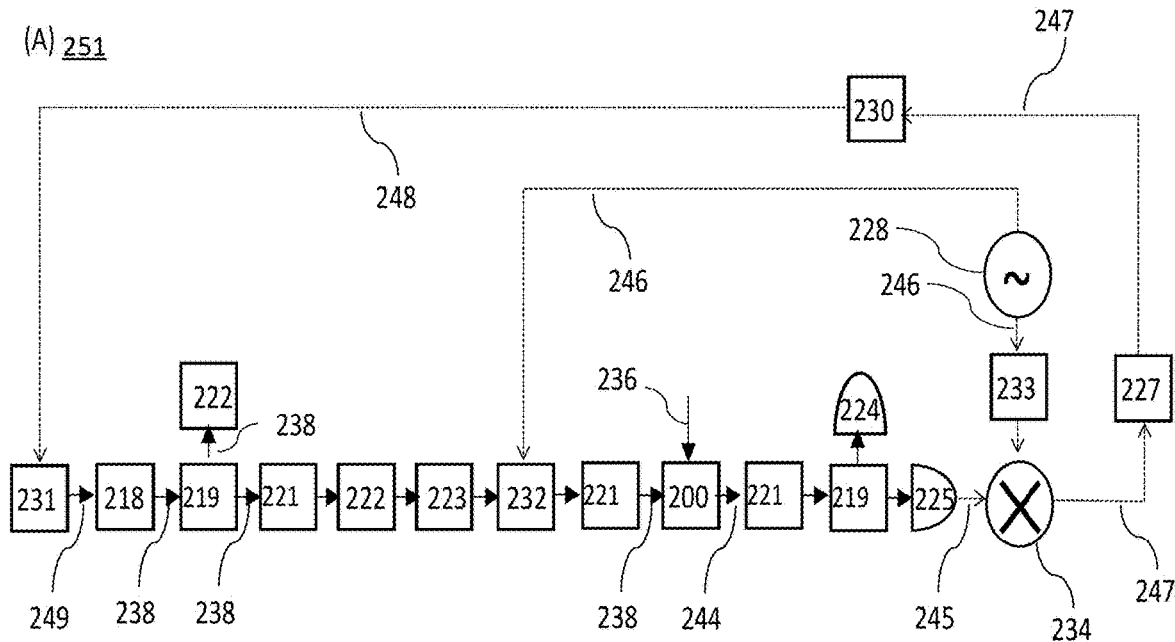
FIG. 21 shows a photonic bolometry system, according to an embodiment.
Figure 21:
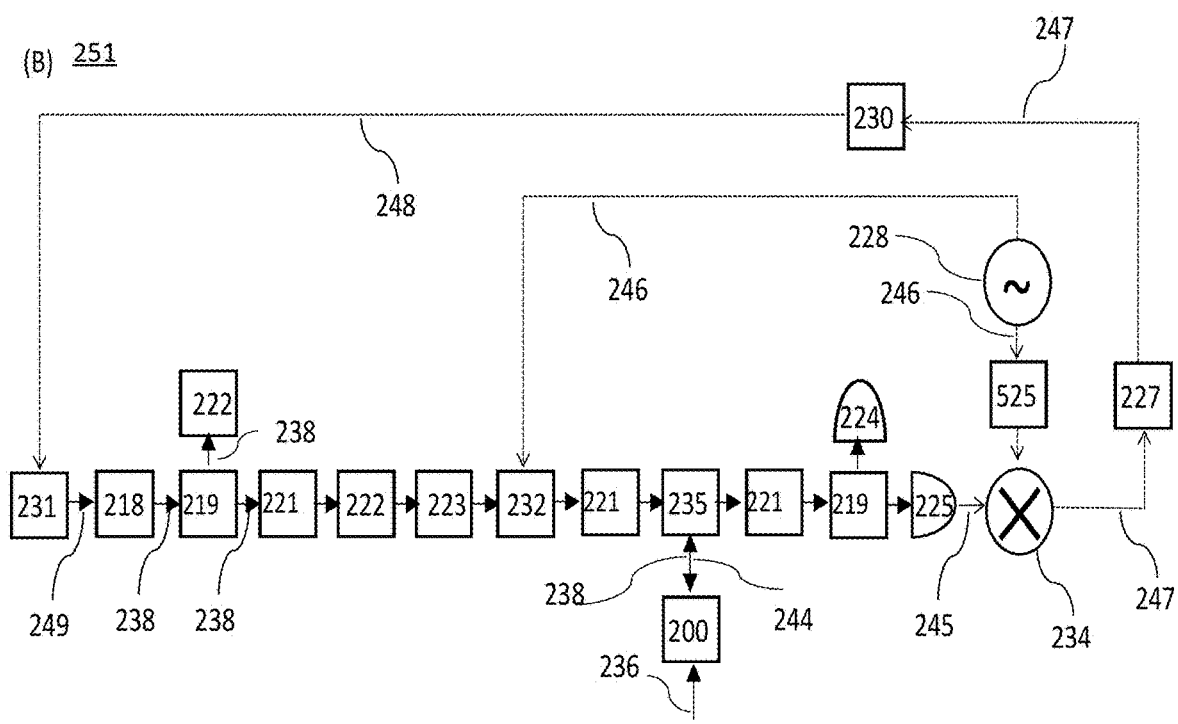

Bolometer light 244 Produced by photonic temperature sensor 216 can be communicated to photonic bolometry system 251 for determine of the temperature increase of photon absorber 217 caused by incident radiation light 236 as well as properties of incident radiation light 236. In an embodiment, with reference to FIG. 19, FIG. 20, and FIG. 21, photonic bolometer 200 performs performing broadband high-absorption photonic bolometry and can include various optical and electrical features to determine temperature, optical resonance shifts, and the like. Here, incident radiation light 236 is received by photonic bolometer 200; probe light source 218 receives control light signal 248 and produces, based on control light signal 248, primary probe light 238 that includes primary wavelength 239 and primary power 243. Photonic bolometer 200 is in communication with probe light source 218 and includes chip waveguide 215, photonic temperature sensor 216, and photon absorber 217. Waveguide 215 is in communication with photonic temperature sensor 216 and receives primary probe light 238; photonic temperature sensor 216 in communication with waveguide 215 and: interacts with primary probe light 238 from waveguide 215, and stores primary probe light 238 when primary wavelength 239 matches resonance frequency 240 of photonic temperature sensor 216, such that an amount of primary probe light 238 stored in photonic temperature sensor 216 includes absorption power 242. Waveguide 215 receives primary probe light 238 after primary probe light 238 has interacted with photonic temperature sensor 216. Bolometer light 244 includes transmission power 241 that is indirectly proportional to absorption power 242 of primary probe light 238 stored in photonic temperature sensor 216. Photodetector 225 is in communication with photonic bolometer 200 and receives bolometer light 244 from photonic bolometer 200; and produces photodetector signal 245 from bolometer light 244. Phase sensitive detector 229 is in communication with photodetector 225 and receives photodetector signal 245 from photodetector 225; receives reference frequency signal 246; and produces lock signal 247 from photodetector signal 245, based on reference frequency signal 246. Local oscillator 228 is in communication with phase sensitive detector 229 and produces reference frequency signal 246. Servo controller 230 is in communication with phase sensitive detector 229 and local oscillator 228 and receives lock signal 247 from phase sensitive detector 229; receives reference frequency signal 246 from local oscillator 228; and produces control light signal 248 from lock signal 247 and reference frequency signal 246 such that absorption power 242 is maximized through wavelength control of probe light source 218 by control light signal 248.

In photonic bolometry system 251, transducer 231 can be electrically interposed between and in communication with light source 218 and servo controller 230. Transducer 231 receives control light signal 248 from servo controller 230; produces transduction control signal 249 based on control light signal 248; and communicates transduction control signal 249 to probe light source 218 to control production of primary wavelength 239 by light source 218. Wavelength meter 220 is in communication with light source 218 and receives primary probe light 238 from probe light source 218 and determines a wavelength of primary wavelength 239. Optical isolator 221, optical attenuator 222, polarization controller 223, or a combination of at least one of the foregoing optical elements is in communication with probe light source 218 and receives primary probe light 238 and varies a property of primary probe light 238. The property of primary probe light 238 that is varied can include a broadband light or a coherent light with a narrow linewidth to provide primary probe light 238 to photonic bolometer 200. Optical power meter 224 is in communication with photonic bolometer 200 and receives bolometer light 244 from photonic bolometer 200 and determines transmission power 241.

In photonic bolometry system 251, bolometer light 244 can be controlled by control light signal 248. It is contemplated that transducer 231 can change the frequency of the probe light source 218 and can include piezo actuator that changes the cavity length. Exemplary transducers 231 include a piezo actuation element, current transducer, Peltier heater and or cooler. In an embodiment, transducer 231 includes piezo actuator that changes the cavity length.

Probe light source 218 produces primary probe light 238. Primary probe light 238 can include light a broadband source or a coherent light source with a narrow linewidth to provide primary probe light 238 to photonic bolometer 200, and can be a light emitted diode, and arc lamp, an infrared laser, a visible laser, and ultraviolet laser, and the like. Exemplary primary probe lights 608 can be tunable diode lasers. Moreover, in the embodiment, primary probe light 238 is emitted form a C-band tunable laser. A wavelength of primary probe light 238 can be from 200 nm to 10 μm, specifically from 400 nm to 3 μm, and more specifically from 500 nm to 2 A power of primary probe light 238 can be from of primary probe light 238 can be from 10 nW to 100 mW, specifically from 50 nW to 50 mW, and more specifically from 100 nW to 10 mW. In an embodiment, primary probe light 238 includes light from C-band tunable laser in a wavelength from 1520 nm to 1570 nm and a laser power from 0.1 mW to 20 mW.

Primary probe light 238 is converted to bolometer light 244 in photonic bolometer 200. Bolometer light 244 can include light transmitted along waveguide 215 with a reduced transmission at the resonant frequency of the photonic bolometer 200. A wavelength of bolometer light 244 can be from 200 nm to 10 μm, specifically from 400 nm to 3 μm, and more specifically from 500 nm to 2 μm. A power of bolometer light 244 can be from 10 nW to 100 mW, specifically from 50 nW to 50 mW, and more specifically from 100 nW to 10 mW. In an embodiment, bolometer light 244 includes light from C-band tunable laser in a wavelength range from 1520 nm to 1570 nm and laser power from 0.1 mW to 20 mW which passed through the photonic bolometer 200.

Optical beam splitter 219 can split or combine light. Exemplary beam splitters 219 include a waveguide-based splitter that couples incoming light flux propagating through an incoming waveguide to two or more waveguides. Moreover, beam splitter 219 is optionally used to provide a portion of the light to a wavelength meter 220, an optical power meter 224, and or photodetector 225, and the like. Moreover, beam splitter 219 is optionally used to provide a portion of the light to an optical power meter 224, and or a wavelength meter 220, and the like. In an embodiment, beam splitter 219 provides 10% of primary probe light 238 to wavelength meter 220, and 90% of light incident from light source is directed to photonic bolometer 200. Moreover, in an embodiment, beam splitter 219 provides 50% of bolometer light 244 to an optical power meter 224, and 50% of bolometer light 244 to photodetector 225.

Optical circulator 235 is three- or four-port non-reciprocal optical device designed that light entering any port exits from the next port. Optical circulator 235 allows light to travel in only one direction. In embodiment, optical circulator 235 is fiber optics circulator, which is non-reciprocal optics device, in which the properties of light passing through the device are not revered when light changes direction from forward to backward. Exemplary optical circulator 235 can separate propagating forward in fiber optics light and reflected backward in fiber optics light. Exemplary optical circulator is based on Faraday rotator. In embodiment optical circulator 235 is single mode fiber or polarization maintaining fiber optics device.

Wavelength meter 220 an element that determines wavelength of light incident of it. Exemplary wavelength monitors 220 diffraction grating, spectrometer, spectrum analyzer, an etalon, wavelength sell, and frequency combs, and the like. Moreover, the wavelength meter 220 produces a wavelength signal that can include a voltage of other electric or photonic signal whose characteristics are determined by the measured wavelength and a specified calibration. Exemplary wavelength signals include DC voltages, the frequency of AC voltages, DC electric currents, microwave signals, and spectra dispersed by a diffraction grating. Moreover, the wavelength meter 220 can determine the frequency of light incident on it. In an embodiment, wavelength meter 220 produces analog DC voltage signal, and the wavelength value displayed on a computer.

Optical isolator 221 can include a magneto-optic device that only allows light to travel in forward direction, and prevent the transmission of light in backward direction. Exemplary optical isolators 221 are Faraday effect isolators. Moreover, optical isolator can operate in infrared, visible, and or UV frequency range. In an embodiment, optical isolator 221 includes fiber-optic, fiber coupled with single-mode and or polarization maintaining single-mode fiber, and optical isolation between 10 dB and 100 dB, specifically between 20 dB and 80 dB, more specifically between 30 dB and 60 dB.

Optical attenuator 222 can include a free space, and or fiber-optic device, that produce attenuation of optical power of incident light. Exemplary optical attenuators 222 include single mode, multimode, polarization-maintaining optical attenuator. Moreover, optical attenuator 222 can operate in infrared, visible, and UV frequency range. Furthermore, optical attenuator 222 can be of fixed attenuation, and of variable attenuation. In an embodiment, optical attenuator 304 includes fiber-optic variable or fixed attenuator with attenuation range between 1 dB and 100 dB, specifically between 2 dB and 80 dB, more specifically between 3 dB and 60 dB.

Polarization controller 223 can include a free-space or fiber-optic device that manipulates the polarization of light. Exemplary polarization controllers 223 include birefringent crystals and calcite polarizers. Moreover, polarization controller 223 utilizes fiber-optic stress-induced birefringence device that can convert between linear, circular, and elliptical polarization of light. In an embodiment, polarization controller 223 can include fiber-optic device that utilizes stress-induced birefringence to create two or three independent fractional wave plates to alter the polarization in single mode fiber. Moreover, in an embodiment, polarization controller 223 can include in-line polarization controller that can transform an arbitrary input polarization of light to arbitrary output polarization of light using a sing a quarter-wave, half-wave, and another quarter-wave plate.

Optical power meter 224 can include an element to absorb incident light and another element to quantify the effect of this absorption, which is proportional to the amount of the light absorbed. Exemplary optical power meter 224 includes photodiodes and bolometers. Moreover, a device with a response that is proportional to the power of light incident upon it may be incorporated into a power meter. Output signal from optical power meter 224 produces power signal that can include DC voltages and DC currents. In an embodiment, an optical power meter 224 includes a germanium-based photodiode, when a light is absorbed in the photodiode, an electron-hole pair is formed within the device, and a voltage is developed across the photodiode junction, measuring a photocurrent between photodiode terminals provides a measure of the optical power incident upon a detector.

Photodector 225 can include an element to receives incident light from which it produces frequency signal, photodetector signal 245. Exemplary photodetectors 225 includes InGaAs and Si photodiodes. In an embodiment, photodetector 225 is an element that produces a measurable voltage or current that can be quantified, in response to incident light. Thermometer light 420 is converted to photodetector signal 245 by photodetector 225. Photodetector signal 245 can include a measurable voltage or current signal that is proportional to incident light. Moreover, a photodetector signal 245 can include a voltage or other electric signals. In embodiment, photodetector signal 245 can be produced by a germanium-based photodiode, when a light is absorbed in the photodiode, an electron-hole pair is formed within the device, and a voltage is developed across the photodiode junction, measuring a photocurrent between photodiode terminals provides a measure of the optical power incident upon a detector. Exemplary photodetectors include power meter, photodiodes, and photoreceivers. Examples of photodetector 225 include InGaAs and or Si photodiode. The bandwidth of the photodetector 225 can be between 0 Hz and 10 GHz, specifically between 100 Hz and 5 GHz, and more specifically between 1 kHz and 1 GHz.

Voltage amplifier 226 can include electronic current or voltage amplifier that amplifies signal from a photodetector 225 by a factor in the range from 2 to a factor to 10000. Exemplary amplifiers 226 include differential amplifier and transimpedance amplifier.

Filter 227 can include a low pass electrical filter that cuts off high-frequency component of the electrical signal. Filter 227 can be used with phase sensitive detector 229. In an embodiment, filter 227 includes a low pass with high-frequency cutoff in the range from 1 kHz to 10 MHz, specifically from 2 kHz and 1 MHz, and more specifically between 10 kHz and 100 kHz.

Phase sensitive detector 229 can include mixer, low pass filter, local oscillator 228 and voltage amplifier 226. Exemplary phase sensitive detector 229 includes lock-in amplifier. Moreover, lock-in amplifier can discriminate signal in noisy environment. In an embodiment, phase sensitive detector 229 includes mixer, low pass filter, local oscillator, and amplifier. These components can be packaged together in the form of lock-in amplifier that is used to detect small changes in the phase of the laser light. Photodetector signal 245 is converted to lock signal 247 by photodetector 225. Lock signal 466 can include an electronic signal. An electronic signal of lock signal 426 can be from 1 nV to 100 V, specifically from 1 uV to 20 V, and more specifically from 1 mV to 10 V.

Local oscillator 228 can include microwave source, and or radio frequency source that produces a known frequency in the microwave and or radio frequency range. Exemplary local oscillator 228 includes a signal generator. Moreover, the frequency produced is coherent, and located in the band from 1 Hz to 10 GHz, specifically from 10 Hz to 1 GHz, and more specifically from 100 Hz to 100 MHz. In an embodiment, local oscillator 228 includes a signal generator with a phase control and operating radio frequency range. Local oscillator 228 produces oscillating electric signal reference frequency signal 246. Reference frequency signal 246 can include a signal from a signal generator or from a lock-in amplifier. Moreover, reference signal 624 can be a signal in the range from 10 Hz to 10 HGz. A reference frequency signal 246 can be from 1 Hz to 10 GHz, specifically from 10

Hz to 1 GHz, and more specifically from 100 Hz to 100 MHz. Reference frequency signal 246 can be used to control electro-optic phase modulator 318. The reference frequency signal 246 is within the range of operation of electro-optic phase modulator 318.

Servo controller 230 can include an electronic instrument that can be used for feedback control applications. In embodiment, servo controller 230 is used for adjusting the frequency of the probe light source 218 (laser). Exemplary servo controllers 230 include instrument that feeds the error signal back to the transducer 231 that modulate the probe light source 218. In an embodiment, servo controller 230 includes three stages differential amplifier stage that generates an error signal, PID filter stage that filter error signal to generate feedback signal, and output stage that provides the control light signal 248. Moreover, in embodiment, PID filter stage adjust the control light signal 248 to use keep an error signal at zero. In embodiment, servo controller 230 produces control light signal 248. Control light signal 248 can include dither error signal, Pound-Drever-Hall error signal, and the like. Moreover, the bandwidth of the servo controller 230 can be from 100 Hz to 1 GHz, specifically from 1 kHz to 500 MHz, and more specifically from 10 kHz to 100 MHz. The control light signal 248 can be from −20 V to +V, specifically from −15 V to +15 V, and more specifically from −10 V to +10V.

Electro-optic phase modulator 232 is a fiber-coupled or a free space device, whose refractive index changes with applied voltage with a fast response time on the order of a nanosecond. The result of voltage modulation on 232 leads to frequency modulation of probe light source 218. Exemplary electro-optic phase modulators 232 include fiber-based electrooptic crystal driven to phase modulate light travelling though the fiber. Moreover, elector-optic phase modulator 232 can include lithium-niobate crystal. In an embodiment, electro-optic phase modulator 232 includes electro-optic crystal that modulate phase of light. Phase modulation depth generated by electro-optic phase modulator 5232 18 can be from 0.001 to 0.1, specifically from 0.005 to 0.1, and more specifically from 0.01 to 0.1.

Mixer 234 can include a non-linear device for generating an error signal, that goes into the servo controller 230 to generate a control signal to adjust the frequency of probe light source 218.

Figure 17:
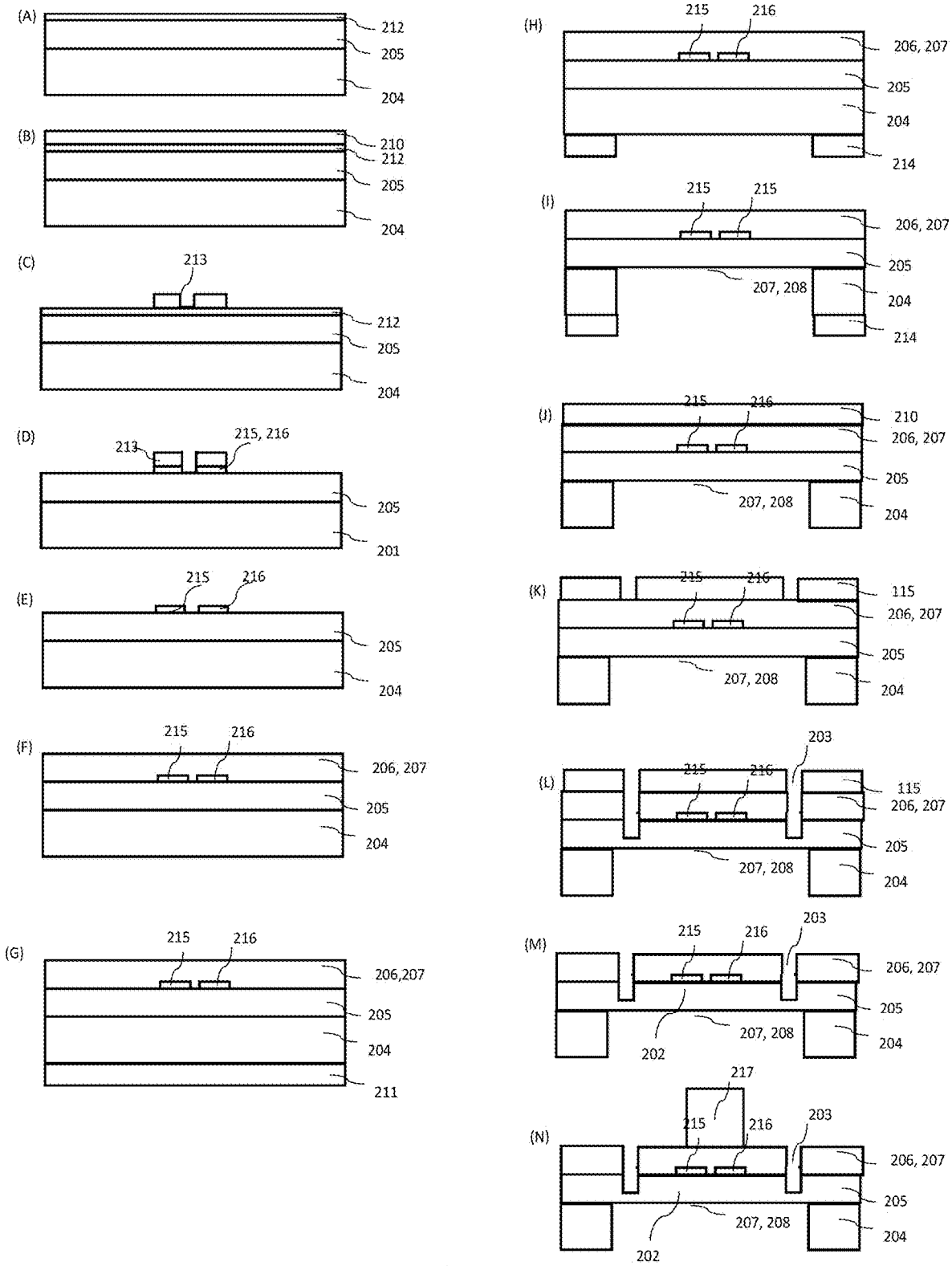
FIG. 17 shows steps involved in making a photonic bolometer, according to an embodiment.
Figure 18:
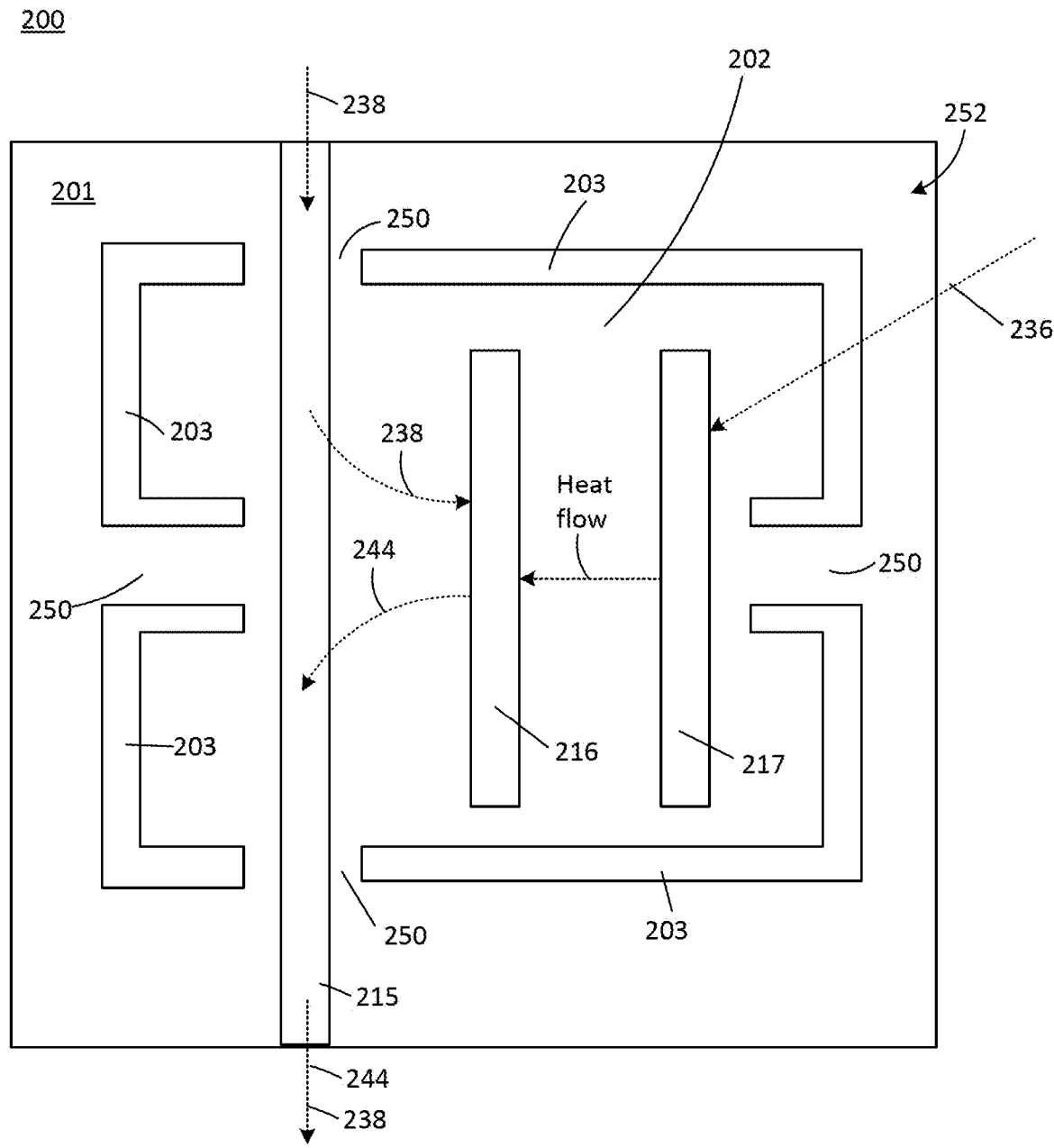
FIG. 18 shows a plan view of a photonic bolometer and indicates reception of incident radiation light by a photon absorber, wherein the photon absorber produces heat that flows from the photon absorber to a photonic temperature sensor, as well as communication of primary probe light and bolometer light in the photonic bolometer, according to an embodiment.

A process for making photonic bolometer 200 can include various steps to form features thereof such as vertically aligned carbon nanotubes and photonic temperature sensor 216 in an array disposed in photonic bolometric pixel 252. Various fabrication methods can be used, including fabrication from silicon, silicon nitride ("silicon-" or "silicon nitride-on-insulator" platform), AlN, TiO, GaAs, and other semiconductor or dielectric materials. In an embodiment, a process for making photonic bolometer 200 includes growing single pixel bolometric detectors with carbon nanotubes over or adjacent to photonic temperature sensor 216 so that photonic bolometer 200 can determine responsivity to incident radiation 236. In an embodiment, with reference to FIG. 17, a process for making photonic bolometer includes: providing substrate 204 (e.g., a silicon-on-insulator, silicon nitride-on-insulator, lithium-niobate-on-insulator, and the like) that includes silicon; forming oxide dielectric 205 on substrate 204 by thermal growth, chemical vapor deposition or plasma-enhanced chemical vapor deposition; forming device layer 212 (e.g., silicon, silicon nitride, aluminum nitride, lithium niobate and the like) on the oxide dielectric 205 by smart cut, wafer bonding, thin film deposition, epitaxial growth, as shown on panel A of FIG. 17. Forming soft (resist) or hard (dielectric or metal) layer 210 on device layer 212 by spin-coating on device layer 212 as shown in panel B of FIG. 17. As shown in panel C of FIG. 17, resist mask 213 is made from layer 210 by lithography (e.g., photolithography, electron beam lithography, nanoimprint lithography). As shown in panel D of FIG. 17, a portion of device layer 212 that is unprotected by resist mask 213 is etched, and a selected portion of device layer 212, that is protected by resist mask 213, forms waveguides 215 and photonic temperature sensor 216. As shown in panel E of FIG. 17, resist mask 213 is dissolved in a solvent, or selectively etch away in plasma, to expose waveguides 215 and photonic temperature sensor 216. As shown in panel F of FIG. 17, a cladded dielectric 206 is formed by depositing an insulating layer such as silicon dioxide on top of waveguides 215 and photonic temperature sensor 216 by chemical vapor deposition or plasma-enhanced chemical vapor deposition, atomic layer deposition. As shown in paned G of FIG. 17 a bottom resist layer is deposited on the substrate 204 by spin-coating. As shown in panel H of FIG. 17, resist mask 214 is made from layer 211 by lithography (e.g., photolithography, electron beam lithography, nanoimprint lithography). As shown in panel I of FIG. 17, a portion of substrate 204 that is unprotected by resist mask 214 is etched, and a selected portion of substrate 204, that is protected by resist mask 214, forms etched cavity 208 or membrane 207. As shown on panel J of FIG. 17 after forming etch cavity 208 or membrane 207, the bottom etch mask 214 is dissolved in solvent. Also, a top resist layer 210 is spin-coated on top of cladded dielectric 206. As shown on panel K of FIG. 17 the etch mask 115 for isolation trench 203 is made from layer 210 by lithography (e.g., photolithography, electron beam lithography, nanoimprint lithography). As shown on panel L of FIG. 17 areas of cladded dielectric 206 that are not protected by etch mask 115 are etched to form isolation trench 203. Following the formation of isolation trench 203, resist mask 115 is dissolved in solvents or selectively etched away in plasma (as shown on panel M of FIG. 17). As shown in panel N of FIG. 17 VACNTS are grown over thermally-isolated member 202 to form photon absorber 217.

Single-pixel photonic bolometers can be made into photonic bolometer arrays by multiplexing a single pixel bolometer into a plurality of bolometers, coupled to the common waveguide 215.

Photonic bolometer 200 has numerous advantageous and unexpected benefits and uses. In an embodiment, a process for performing broadband high-absorption photonic bolometry with photonic bolometer 200 includes: receiving primary probe light 238 by a chip waveguide 215 of the photonic bolometer 200; communicating the primary probe light 238 from the chip waveguide 215 to a photonic temperature sensor 216 of the photonic bolometer 200; receiving incident radiation light 236 by a photon absorber 217 of the photonic bolometer 200; increasing the temperature of the photon absorber 217 in response to receiving the incident radiation light 236; communicating heat from the photon absorber 217 to the photonic temperature sensor 216; receiving, by the photonic temperature sensor 216, the heat from the photon absorber 217 and increasing a temperature of the photonic temperature sensor 216 in response to receiving the heat from the photon absorber 217; changing a resonance frequency of the photonic temperature sensor 216 in response to increasing the temperature of the photonic temperature sensor 216 due to absorption of the incident radiation light 236 by the photon absorber 217; producing, by the photonic temperature sensor 216, bolometer light 244 from the primary probe light 238 based on the change of the resonance frequency due to heating the photonic temperature sensor 216; communicating the bolometer light 244 from the photonic temperature sensor 216 to the chip waveguide 215; and determining the temperature change of the photonic temperature sensor 216 due to the absorption of the incident radiation light 236 by the photon absorber 217 from the bolometer light 244 to perform broadband high-absorption photonic bolometry.

Advantageously, photonic bolometer 200 uses silicon photonics and carbon nanotubes with a silicon waveguide that are compatible with carbon nanotube growth and processing. It is contemplated that the bolometer can include unsuspended high-Q optical resonators with or without carbon nanotubes to measure differential response, a suspended (or supported by a thermally isolation area/membrane) high-Q optical resonator, or a linear array of elements for multiplexed read out.

Integrated silicon waveguides and associated silicon photonic devices such as photonic crystal cavities, ring resonators, and the like can include carbon nanotubes. A high temperature growth process (800° C.), thin film catalyst (Fe, Ni, Co or other transition metal), and support catalyst (aluminum oxide, aluminum nitride, or other metal oxide/nitride) do not degrade waveguide performance as indicated by transmission measurement of power through a selectively patterned region with grown carbon nanotubes is not noticeably attenuated. A scanning electron microscope image is shown for VACNTs grown on top of photonic thermometer in FIG. 2.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. A photonic bolometer for performing broadband high-absorption photonic bolometry, the photonic bolometer comprising:
    a photonic chip;
    a weak thermal link disposed on and in mechanical communication with the photonic chip;
    a thermally-isolated member disposed on the weak thermal link and in mechanical communication with the weak thermal link, such that the weak thermal link is interposed between the thermally-isolated member and the photonic chip, and the weak thermal link thermally isolates the thermally-isolated member from the photonic chip;
    a photonic temperature sensor disposed on the thermally-isolated member and comprising a resonance frequency from which a temperature of the thermally-isolated member is determinable and that varies with temperature of the thermally-isolated member, wherein the photonic temperature sensor receives primary probe light from a chip waveguide and produces a bolometer light from the primary probe light;
    the chip waveguide disposed on the thermally-isolated member in optical communication with the photonic temperature sensor and that communicates the primary probe light to the photonic temperature sensor and that monitors transmission and storage of the primary probe light by the photonic temperature sensor, wherein the chip waveguide receives the bolometer light from the photonic temperature sensor to determine the temperature of the thermally-isolated member via a change in resonance frequency of the photonic temperature sensor; and
    a photon absorber disposed on the thermally-isolated member in thermal communication with the photonic temperature sensor and that receives incident radiation light, increases temperature due to absorption of the incident radiation light, heats the photonic temperature sensor in response to receipt of the incident radiation light, and changes the resonance frequency of the photonic temperature sensor in response to receiving the incident radiation light.

2. The photonic bolometer of claim 1, further comprising an isolation trench bounded by the photonic chip and the thermally-isolated member, such that the isolation trench is interposed between the photonic chip and the thermally-isolated member.

3. The photonic bolometer of claim 2, wherein the isolation trench surrounds the thermally-isolated member.

4. The photonic bolometer of claim 1, further comprising a reference phonic thermometer disposed on the photonic chip to measures a temperature of the substrate.

5. The photonic bolometer of claim 1, wherein the weak thermal link mechanically interconnects the thermally-isolated member and the photonic chip.

6. The photonic bolometer of claim 1, further comprising an undercut arranged between the substrate and the thermally-isolated member.

7. The photonic bolometer of claim 6, wherein the undercut spaces apart the substrate and the thermally-isolated member so that the chip waveguide, the photonic temperature sensor, and the photon absorber are suspended above and relative to the substrate, with the chip waveguide extending from opposing portions of an oxide dielectric, which are interposed between the chip waveguide and the substrate, over the substrate, and the photon absorber is disposed on the photonic temperature sensor.

8. The photonic bolometer of claim 1, wherein the photonic temperature sensor is interposed between the chip waveguide and the photon absorber.

9. The photonic bolometer of claim 1, wherein the photonic temperature sensor and the photon absorber are disposed proximate to the chip waveguide, and the photon absorber is disposed on the photonic temperature sensor so that the photonic temperature sensor is interposed between the photon absorber and the thermally-isolated member.

10. The photonic bolometer of claim 1, wherein the photonic chip, the thermally-isolated member, and the weak thermal link independently comprise a semiconductive material.

11. The photonic bolometer of claim 1, wherein the photonic temperature sensor comprises a photonic crystal cavity, a ring resonator, or a disk resonator, such that the resonance frequency of the photonic temperature sensor is sensitive to temperature.

12. The photonic bolometer of claim 1, further comprising a cladded dielectric disposed on the photonic temperature sensor, such that the photonic temperature sensor is interposed between the cladded dielectric and the substrate.

13. The photonic bolometer of claim 1, wherein the photonic temperature sensor comprises a semiconductive material.

14. The photonic bolometer of claim 1, wherein the photon absorber comprises vertically alinged carbon nanotubes.

15. The photonic bolometer of claim 1, wherein the weak thermal link, the thermally-isolated member, the photonic temperature sensor, and the photon absorber are arranged as a single photonic bolometric pixel in the photonic bolometer.

16. The photonic bolometer of claim 15, further comprising additional photonic bolometric pixels arranged in an array.

17. The photonic bolometer of claim 16, wherein the chip waveguide extends along the photonic bolometer so that the chip waveguide is in optical communication with each photonic temperature sensor in each photonic bolometric pixel and:
communicates primary probe light to each photonic temperature sensor in each photonic bolometric pixel; and
receives bolometer light from each photonic temperature sensor in each photonic bolometric pixel,
such that the at least a two-dimensional termperature map is obtained across the photonic bolometer from the bolometer light from each photonic temperature sensor in each photonic bolometric pixel.

18. A photonic bolometry system, comprising:
a probe light source that receives a control light signal and produces a primary probe light based on the control light signal;
a photonic bolometer in optical communication with the probe light source and that receives the primary probe light from the probe light source, receives incident radiation light, and produces ref a244 from the ref a206 in response to receiving the incident radiation light, the photonic bolometer comprising:
a photonic chip;
a weak thermal link disposed on and in mechanical communication with the photonic chip;
a thermally-isolated member disposed on the weak thermal link and in mechanical communication with the weak thermal link, such that the weak thermal link is interposed between the thermally-isolated member and the photonic chip, and the weak thermal link thermally isolates the thermally-isolated member from the photonic chip;
a photonic temperature sensor disposed on the thermally-isolated member and comprising a resonance frequency from which a temperature of the thermally- isolated member is determinable and that varies with temperature of the thermally- isolated member, wherein the photonic temperature sensor receives primary probe light from a chip waveguide and produces a bolometer light from the primary probe light;
the chip waveguide disposed on the thermally-isolated member in optical communication with the photonic temperature sensor and that communicates the primary probe light to the photonic temperature sensor and that monitors transmission and storage of the primary probe light by the photonic temperature sensor, such that the chip waveguide receives the primary probe light from the probe light source, receives the bolometer light from the photonic temperature sensor, and communicates the bolometer light to a photodetector; and
a photon absorber disposed on the thermally-isolated member in thermal communication with the photonic temperature sensor and that receives incident radiation light, increases temperature due to absorption of the incident radiation light, heats the photonic temperature sensor in response to receipt of the incident radiation light, and changes the resonance frequency of the photonic temperature sensor in response to receiving the incident radiation light;
a photodetector in optical communication with the photonic bolometer and that receives the bolometer light from the chip waveguide of the photonic bolometer and produces photodetector signal in response to receiving the bolometer light from the photonic bolometer;
a phase sensitive detector in electrical communication with the photodetector and that receives the photodetector signal from the photodetector, receives a reference frequency signal, and produces a lock signal based on the photodetector signal with reference to the reference frequency signal;
a local oscillator in electrical communication with the phase sensitive detector and a servo controller and that produces the reference frequency signal and communciates the reference frequency signal to the phase sensitive detector and the servo controller;
the servo controller in electrical communication with the phase sensitive detector and the local oscillator and that receives the lock signal from the phase sensitive detector, receives the reference frequency signal from the local oscillator, produces control light signal in response to receiving the lock signal and the reference frequency signal, and communicates the control light signal to the probe light source, wherein the the temperature of the thermally-isolated member is determined via a change in resonance frequency of the photonic temperature sensor.

19. A process for performing broadband high-absorption photonic bolometry with a photonic bolometer, the process comprising:

receiving primary probe light by a chip waveguide of the photonic bolometer;

communicating the primary probe light from the chip waveguide to a photonic temperature sensor of the photonic bolometer;

receiving incident radiation light by a photon absorber of the photonic bolometer;

increasing the temperature of the photon absorber in response to receiving the incident radiation light;

communicating heat from the photon absorber to the photonic temperature sensor;

receiving, by the photonic temperature sensor, the heat from the photon absorber and increasing a temperature of the photonic temperature sensor in response to receiving the heat from the photon absorber;

changing a resonance frequency of the photonic temperature sensor in response to increasing the temperature of the photonic temperature sensor due to absorption of the incident radiation light by the photon absorber;

producing, by the photonic temperature sensor, bolometer light from the primary probe light based on the change of the resonance frequency due to heating the photonic temperature sensor;

communicating the bolometer light from the photonic temperature sensor to the chip waveguide; and determining the temperature change of the photonic temperature sensor due to the absorption of the incident radiation light by the photon absorber from the bolometer light to perform broadband high-absorption photonic bolometry.

20. The process for of claim 19, wherein the photonic bolometer comprises:

a photonic chip;

a weak thermal link disposed on and in mechanical communication with the photonic chip;

a thermally-isolated member disposed on the weak thermal link and in mechanical communication with the weak thermal link, such that the weak thermal link is interposed between the thermally-isolated member and the photonic chip, and the weak thermal link thermally isolates the thermally-isolated member from the photonic chip;

the photonic temperature sensor disposed on the thermally-isolated member and comprising a resonance frequency from which a temperature of the thermally-isolated member is determinable and that varies with temperature of the thermally-isolated member, wherein the photonic temperature sensor receives primary probe light from a chip waveguide and produces a bolometer light from the primary probe light;

the chip waveguide disposed on the thermally-isolated member in optical communication with the photonic temperature sensor and that communicates the primary probe light to the photonic temperature sensor and that monitors transmission and storage of the primary probe light by the photonic temperature sensor, wherein the chip waveguide receives the bolometer light from the photonic temperature sensor to determine the temperature of the thermally-isolated member via a change in resonance frequency of the photonic temperature sensor; and the photon absorber disposed on the thermally-isolated member in thermal communication with the photonic temperature sensor and that receives incident radiation light, increases temperature due to absorption of the incident radiation light, heats the photonic temperature sensor in response to receipt of the incident radiation light, and changes the resonance frequency of the photonic temperature sensor in response to receiving the incident radiation light.

* * * * *